United States Patent
Nonaka et al.

(10) Patent No.: US 11,863,261 B2
(45) Date of Patent: Jan. 2, 2024

(54) BASE STATION AND BASE STATION COMMUNICATION METHOD

(71) Applicant: NTT DOCOMO, INC., Tokyo (JP)

(72) Inventors: Nobuhide Nonaka, Tokyo (JP); Tatsuki Okuyama, Tokyo (JP); Satoshi Suyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 114 days.

(21) Appl. No.: 17/603,144

(22) PCT Filed: Dec. 23, 2019

(86) PCT No.: PCT/JP2019/050348
§ 371 (c)(1),
(2) Date: Oct. 12, 2021

(87) PCT Pub. No.: WO2020/217586
PCT Pub. Date: Oct. 29, 2020

(65) Prior Publication Data
US 2022/0200672 A1    Jun. 23, 2022

(30) Foreign Application Priority Data

Apr. 26, 2019 (JP) ................... 2019-085355

(51) Int. Cl.
*H04B 7/0456* (2017.01)
*H04B 7/08* (2006.01)
(Continued)

(52) U.S. Cl.
CPC ............. *H04B 7/0456* (2013.01); *H04B 7/08* (2013.01); *H04W 72/046* (2013.01); *H04W 72/21* (2023.01)

(58) Field of Classification Search
CPC .. H04B 7/0456; H04B 7/0671; H04B 7/0676; H04W 72/23; H04W 72/232
See application file for complete search history.

(56) References Cited

U.S. PATENT DOCUMENTS 10,454,533 B1\* 10/2019 Kogiantis ................ H04B 7/01
2004/0248519 A1\* 12/2004 Niemela .................. H04B 7/01
455/67.11

(Continued)

OTHER PUBLICATIONS

S. Han et al. "Reference Signals Design for Hybrid Analog and Digital Beamforming", IEEE Communications Letters, vol. 18, No. 7, pp. 1191-1193, Jul. 2014. (3 pages).
(Continued)

*Primary Examiner* — Kevin Kim
(74) *Attorney, Agent, or Firm* — Osha Bergman Watanabe & Burton LLP

(57) ABSTRACT

This base station comprises: a control unit that allocates, on the basis of a doppler shift estimated using an uplink reference signal, a downlink reference signal common to a plurality of beams; and a transmission unit that transmits the common downlink reference signal via the plurality of beams. According to this base station communication method, the base station allocates, on the basis of a doppler shift estimated using an uplink reference signal, a downlink reference signal common to a plurality of beams, and transmits the common downlink reference signal via the plurality of beams.

5 Claims, 28 Drawing Sheets

(51) Int. Cl.
*H04W 72/044* (2023.01)
*H04W 72/21* (2023.01)

(56) References Cited

U.S. PATENT DOCUMENTS

2016/0192401 A1\* 6/2016 Park .................. H04W 72/0453
  370/329
2017/0366377 A1\* 12/2017 Papasakellariou .... H04L 1/0026
2019/0053013 A1\* 2/2019 Markhovsky ....... H04L 43/0864

OTHER PUBLICATIONS

International Search Report issued in International Application No. PCT/JP2019/050348, dated Mar. 24, 2020 (5 pages).
Written Opinion issued in International Application No. PCT/JP2019/050348; dated Mar. 24, 2020 (3 pages).

\* cited by examiner

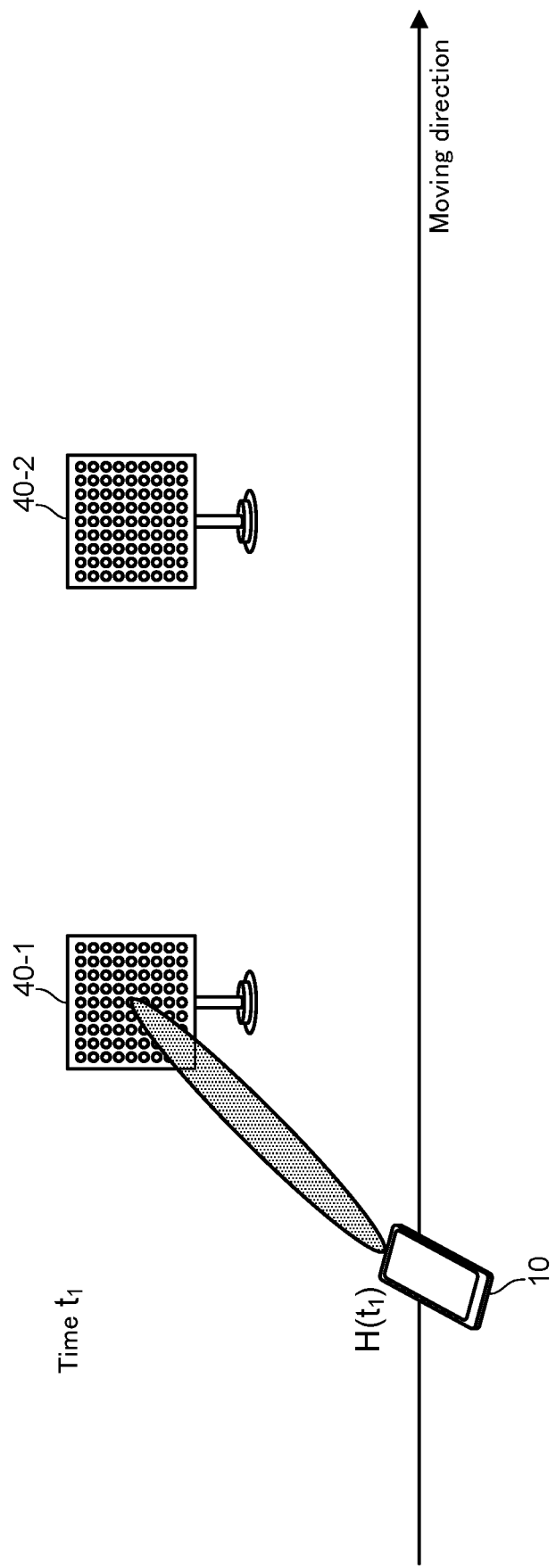

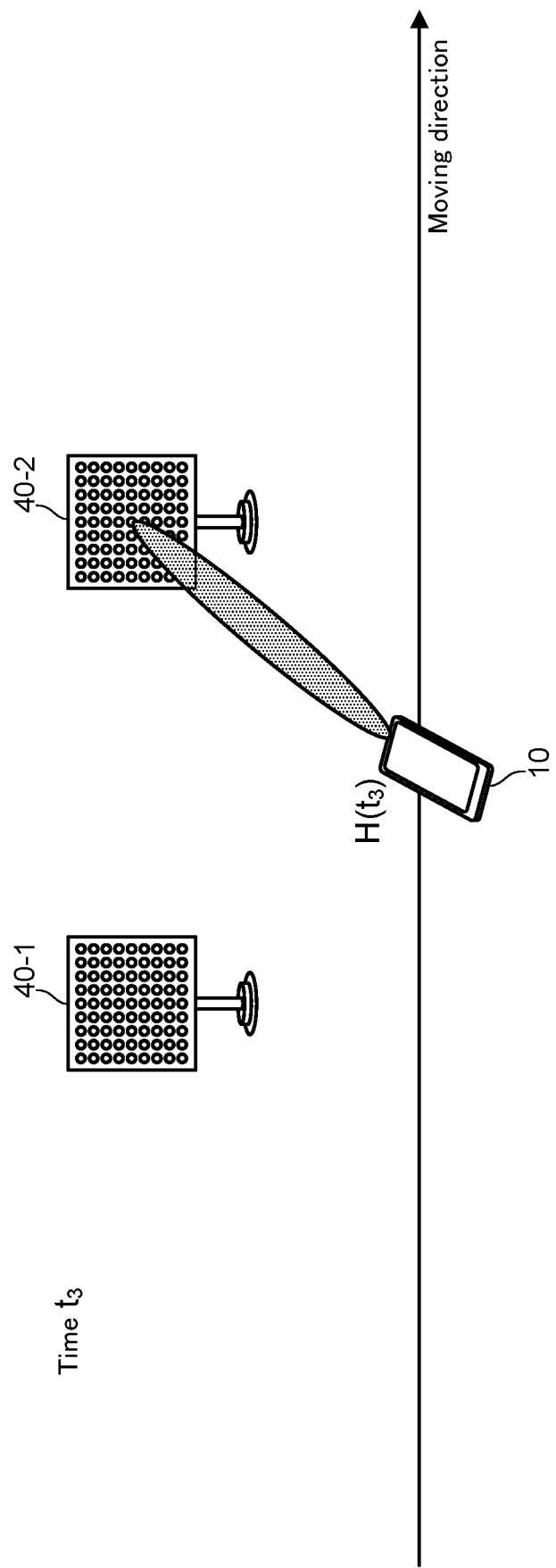

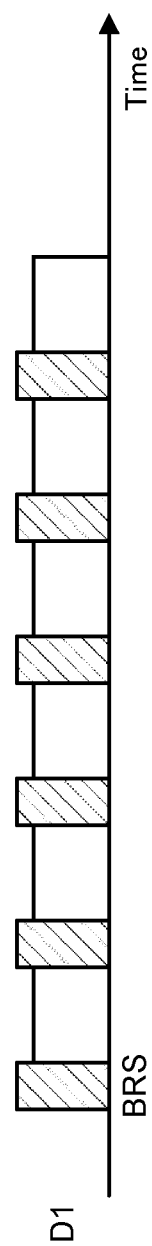

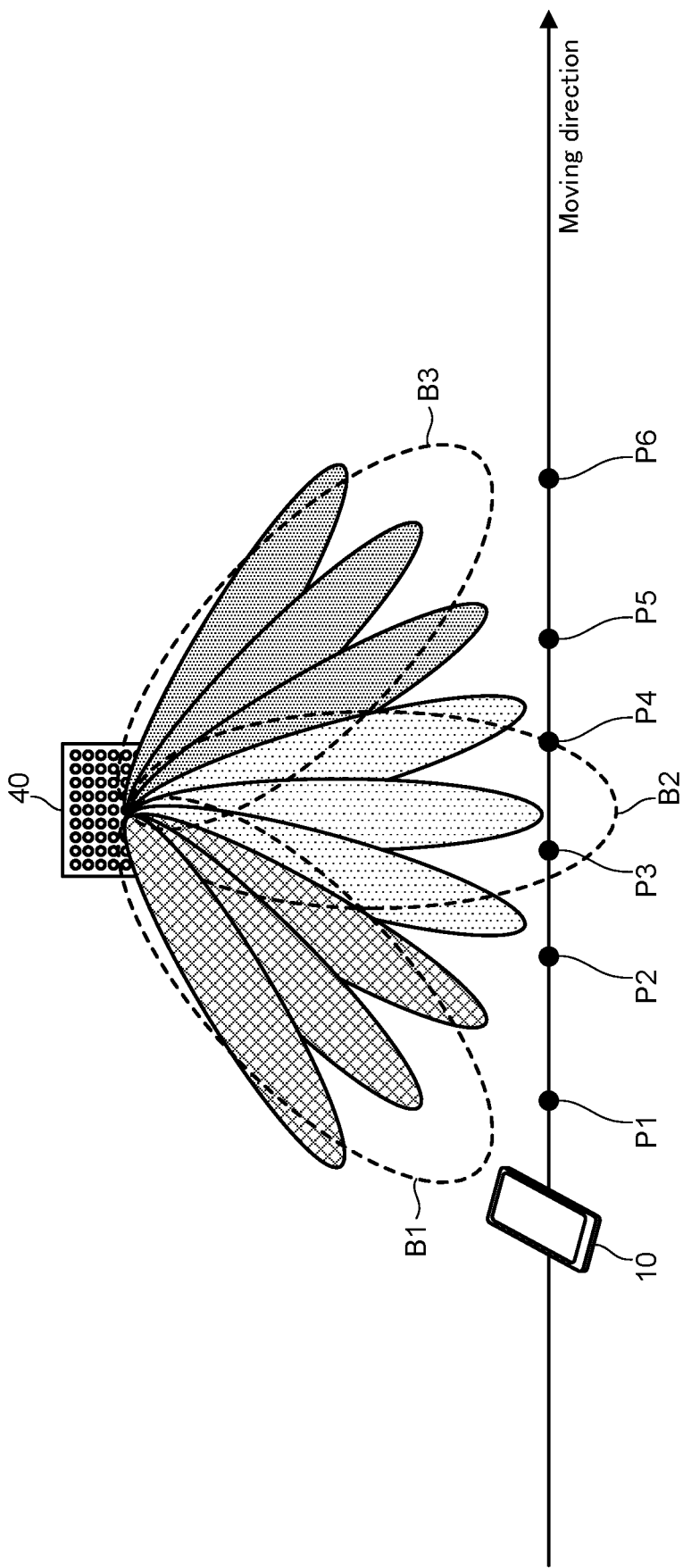

BASE STATION AND BASE STATION COMMUNICATION METHOD

TECHNICAL FIELD

The present disclosure relates to a base station and a communication method for the base station.

BACKGROUND ART

Recently, in order to cope with explosively increasing mobile communication traffic, radio communication techniques using a high frequency band of several GHz to tens of GHz within which a broad band is easily used have attracted attention. As the radio communication techniques using a high frequency band, for example, a high-frequency-band small cell and a Massive MIMO antenna have been proposed. Note that MIMO is an abbreviation of "Multiple Input Multiple Output."

CITATION LIST

Non-Patent Literature

NPL 1

S. Han et al., "Reference signals design for hybrid analog and digital beamforming," IEEE Commun. Lett., vol. 18, no. 7, pp. 1191-1193, Jul. 2014.

SUMMARY OF INVENTION

Technical Problem

However, in a radio environment of a high frequency band, there is scope for further study on improvement in performance of radio communication dependent on movement of a terminal (e.g., a mobile station).

An object of one aspect of the present disclosure is to improve radio communication performance dependent on movement of a terminal.

Solution to Problem

A base station according to one aspect of the present disclosure is configured to include: a control section that assigns a common downlink reference signal to a plurality of beams based on a Doppler shift estimated using an uplink reference signal; and a transmission section that transmits the common downlink reference signal in the plurality of beams.

In a communication method for a base station according to one aspect of the present disclosure, the base station is configured to: assign a common downlink reference signal to a plurality of beams based on a Doppler shift estimated using an uplink reference signal; and transmit the common downlink reference signal in the plurality of beams.

ADVANTAGEOUS EFFECTS OF INVENTION

According to the present disclosure, it is possible to improve radio communication performance dependent on movement of a terminal.

BRIEF DESCRIPTION OF DRAWINGS

FIG. 3A is an explanatory view illustrating an example of a radio communication environment including a mobile station that is an example of a terminal;

FIG. 3C is an explanatory view illustrating an example of a radio communication environment including the mobile station that is an example of the terminal;

FIG. 8B illustrates an example of the RS design determined for the base station according to Embodiment 1;

FIG. 9A illustrates an example of beams generated by the base station according to Embodiment 1;

DESCRIPTION OF EMBODIMENTS

High-Frequency-Band Small Cell

Figure 1:
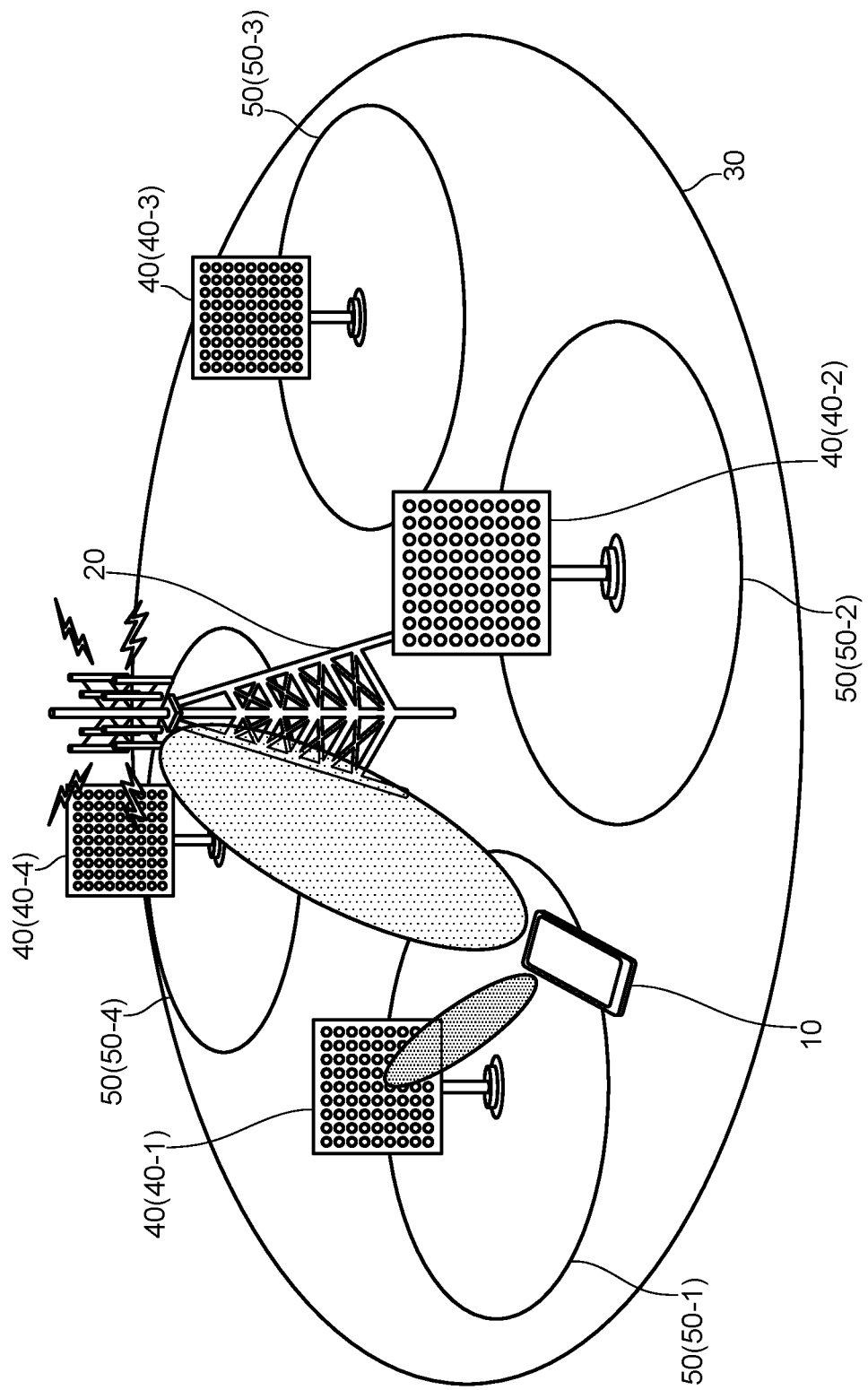
FIG. 1 illustrates an example of a radio communication system.

FIG. 1 illustrates an example of a radio communication system. As illustrated in FIG. 1, the radio communication system may include one or more first base stations 20 and a plurality of second base stations 40. As one non-limiting example, FIG. 1 illustrates four base stations 40-1, 40-2, 40-3, and 40-4.

Base station 20 exemplarily forms cell 30. Base stations 40 (40-1, 40-2, 40-3, and 40-4) form cells 50 (50-1, 50-2, 50-3, and 50-4), respectively. Cells 50 may be encompassed within cell 30 or may partially overlap with cell 30. Cell 30 may be, for example, a macro cell, and each of cells 50 may be, for example, a cell (e.g., a small cell or a semi-macro cell) having a smaller coverage than the macro cell.

Base station 20 may be, for example, an aggregate node (central unit (CU)) and some or all of base stations 40 may be, for example, distributed nodes (distributed units (DUs)) connected to CU 20 by a fronthaul (FH) interface. For example, a common public radio interface (CPRI) may be applied as the FH interface. The CU may be referred to as "centralized baseband unit (CBBU)" or "BBU." In the following description, a base station corresponding to the CU may be referred to as a "macro base station," "macro cell," or "core apparatus" for convenience. On the other hand, a base station corresponding to the DU may be referred to as a "small base station," "small cell," "base station cell," or "radio apparatus" for convenience.

Mobile station 10 connects with (accesses) at least one of macro base station 20 and small base stations 40. In areas where macro cell 30 and small cells 50 overlap, mobile station 10 is capable of connecting with both macro base station 20 and small base stations 40. Cells 40 may be assigned a high frequency band (e.g., a frequency band of several GHz to tens of GHz that is a frequency band used for 5th Generation New Radio (5G NR)) higher than the frequency band in cell 30. Cell 30 may be assigned a low frequency band (e.g., a frequency band of several hundred MHz to several GHz that is a frequency band used for Long Term Evolution (LTE)).

In the high frequency band of several GHz to tens of GHz, it is easier to secure a radio resource (hereinafter, referred to simply as "resource") of a broader bandwidth as compared with the low frequency band, and thus, high-speed and large-capacity communication can be realized. On the other hand, a radio wave in the high frequency band has higher straightness and has a shorter wavelength than a radio wave in the low frequency band. Accordingly, the radio wave in the high frequency band is likely to suffer a greater radio wave propagation loss, and the communication distance thus tends to be shorter. Therefore, the coverages of cells 50 that can be formed by base stations 40 tend to be smaller than the coverage of macro cell 30 formed by base station 20 as illustrated in FIG. 1. Note that, a cell utilizing a high frequency band (e.g., small cell or semi-macro cell) may be referred to as "high-frequency-band cell" or "high-frequency-band small cell."

Massive MIMO Antenna

Massive MIMO transmission using a massive MIMO antenna including, for example, 100 or more antenna elements may be applied to radio signal transmission in high-frequency-band cells 40. The massive MIMO antenna includes a large number of antenna elements, so as to be capable of facilitating spatial multiplexing of transmission and reception streams to achieve high-speed and large-capacity radio communication. The massive MIMO antenna also makes it possible to realize enhanced beamforming (BF) as follows.

Figure 2A:
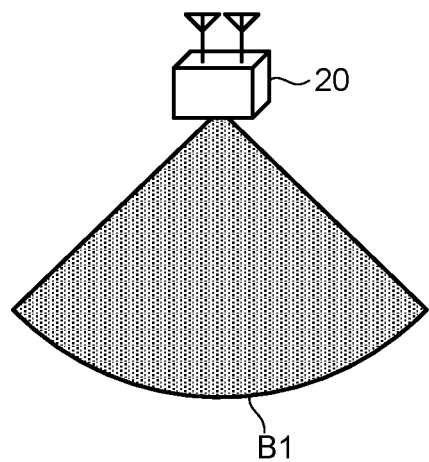
FIG. 2A is an explanatory view illustrating an example of beamforming in a low frequency band.
Figure 2B:
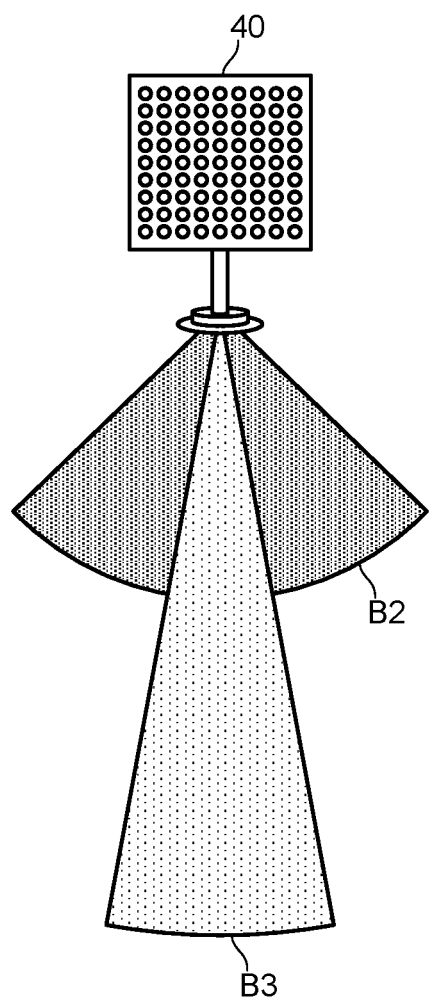
FIG. 2B is an explanatory view illustrating an example of beamforming in a high frequency band.

FIG. 2A is an explanatory view illustrating an example of beamforming in a low frequency band. FIG. 2B is an explanatory view illustrating an example of beamforming in a high frequency band.

Beam B2 in the high frequency band illustrated in FIG. 2B suffers a greater radio wave propagation loss than beam B1 in the low frequency band illustrated in FIG. 2A. Thus, the reachable distance of beam B2 in the high frequency band is likely to be shorter than beam B1 in the low frequency band having the same full width at half maximum illustrated in FIG. 2A. In order to extend the reachable distance of beam B2 in the high frequency band, (sharper) beam B3 having a narrower full width at half maximum is generated, for example, by beamforming using the massive MIMO antenna. The beamforming allows an increase in beam gain (which may also be referred to as "beamforming gain," hereinafter), to extend the reachable distance of beam B3. In other words, a decrease in reception strength due to the increase in the propagation loss of the radio wave in the high frequency band can be covered by the beamforming gain produced using the massive MIMO antenna. Further, beamforming using a large number of MIMO antenna elements allows the directivity of a beam to be directed in a particular direction, so as to allow, for example, easier reduction of interference with other cells, thereby improving resource utilization efficiency.

Further, the size of each of the MIMO antenna elements can be small because the size is proportional to the wavelength of the radio wave to be transmitted and received. The shorter the wavelength of the radio wave to be transmitted and received (i.e., the higher the frequency), the smaller the size of the antenna element can be. Therefore, the massive MIMO antenna in the high frequency band as a whole can be miniaturized relatively easily despite including a large number of antenna elements.

High-Speed Movement Environment in High-Frequency Band

Figure 3B:
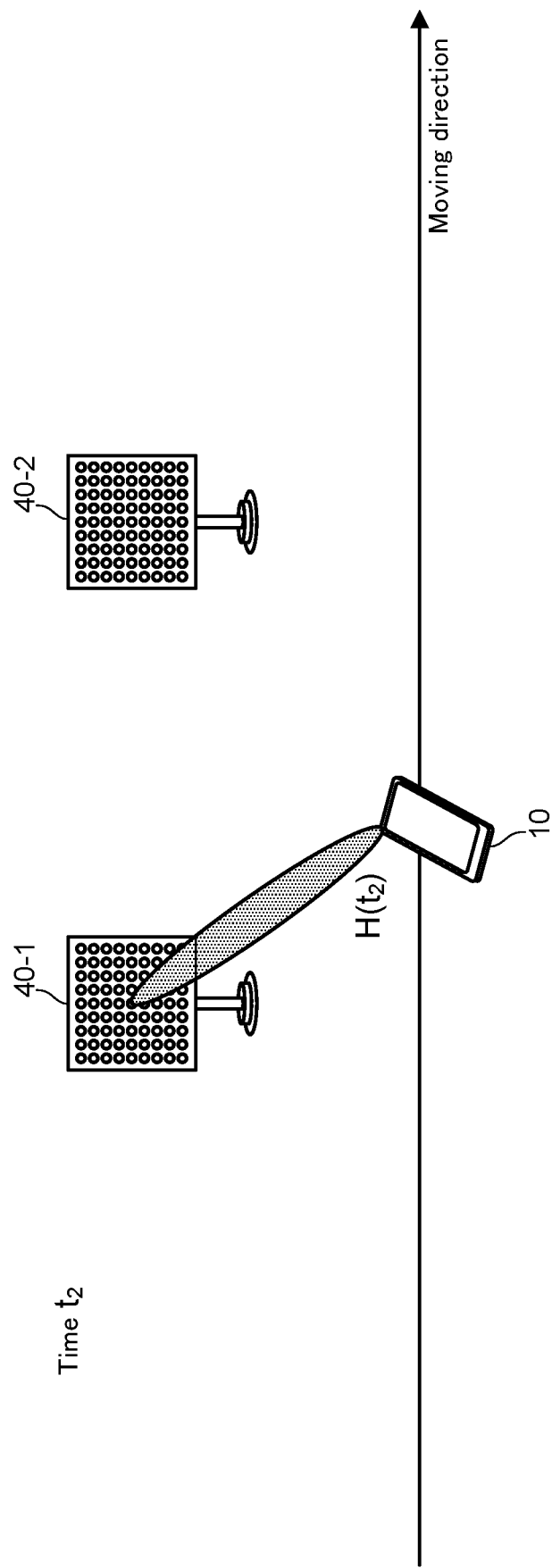
FIG. 3B is an explanatory view illustrating an example of the radio communication environment including the mobile station that is an example of the terminal.

FIGS. 3A to 3C are explanatory views illustrating examples of radio communication environments including mobile station 10 that is an example of the terminal. In FIGS. 3A to 3C, mobile station 10 moves across base station cells 40-1 and 40-2. The movement of mobile station 10 may be exemplarily assumed to be high-speed movement of a vehicle in transportation, such as a car, a railway, or the like.

For example, when mobile station 10 is moving at high speed, a change of channel state information (CSI) due to the Doppler effect is larger in the radio communication in the high frequency band than in the radio communication in the low frequency band. Depending on the moving speed of mobile station 10, an abrupt change may occur in the CSI. Note that the CSI is estimated (or measured) at mobile station 10, for example, based on a reference signal (RS) transmitted by base station 40 (or 20) and is fed back (reported) to base station 40 (or 20). The CSI report includes, for example, information on a beam suitable for reception at mobile station 10 (e.g., beam number (index), precoding weight index, and/or the like). Base station 40 (or 20) controls DL transmission to mobile station 10 based on the CSI report from mobile station 10. For example, the DL transmission control based on the CSI report may include adaptive determination of a modulation and coding scheme, control on the number of transmission streams, and determination of a precoding weight. When an abrupt temporal change occurs in the CSI with the movement of mobile station 10, adaptive control on DL transmission cannot follow the change, and the transmission performance (e.g., throughput) deteriorates due to a channel estimation error between channels at the time of CSI measurement and at the time of data transmission.

For example, channels $H(t_1)$, $H(t_2)$, and $H(t_3)$ estimated at times $t_1$ to $t_3$ illustrated in FIG. 3A to FIG. 3C are different from one another. The higher the moving speed of mobile station 10, the larger the change of channel H estimated at mobile station 10 becomes due to the effect of the Doppler shift. When the change of channel H estimated at mobile station 10 becomes large, the change of the CSI reported from mobile station 10 to base station 40 also becomes large. For example, base station cell 40-1 controls the DL transmission to mobile station 10 using the CSI report based on channel $H(t_1)$. However, when mobile station 10 has already moved at high speed to the position illustrated in FIG. 3B at time $t_2$, channel $H(t_2)$ at time $t_2$ is significantly different from channel $H(t_1)$ at time $t_1$. Thus, when base station cell 40-1 controls the DL transmission to mobile station 10 at time $t_2$ illustrated in FIG. 3B based on the CSI report at time $t_1$, the DL transmission control suitable for channel $H(t_2)$ is not performed, and the transmission performance is degraded depending on an error between channel $H(t_1)$ and channel $H(t_2)$.

Further, for example, at time $t_3$ illustrated in FIG. 3C, base station cell 40 to which mobile station 10 is connected is switched from base station cell 40-1 to base station cell 40-2. As connection-target base station cell 40 switches, channel $H(t_2)$ changes to channel $H(t_3)$, and a beam selected based on the CSI report switches accordingly. Here, as described above, the full width at half maximum of the beam is narrower by the BF using the massive MIMO antenna. That is, the beam is sharper, which increases the switching frequency of the beam to be switched with the movement of mobile station 10.

To address these issues, it is conceivable, for example, to increase the transmission frequency of a downlink (DL) reference signal, such as a beam reference signal (BRS) or a CSI measurement reference signal (in other words, to shorten the transmission periodicity). However, when the transmission frequency of the reference signal is increased, the radio overhead increases, and the communication performance (e.g., data throughput) is degraded.

Note that, the DL reference signal (RS) may be any signal known between mobile station 10 and base station 40 (or 20). For example, the BRS may be replaced by another reference signal, such as a synchronization signal (SS), a synchronization signal block (SS/PBCH block), or a channel-state information reference signal (CSI-RS). In addition, the application of the CSI measurement reference signal is not limited to, for example, CSI measurement, but may also be used for other uses such as phase noise compensation. In addition, the RS may be a demodulation reference signal (DMRS) or a phase tracking reference signal (PTRS).

In the following, an embodiment relating to a radio communication control capable of reducing a decrease in communication performance caused by the movement of the terminal in the high frequency band will be described with reference to the drawings.

One Example of Configuration according to Present Disclosure

Figure 4:
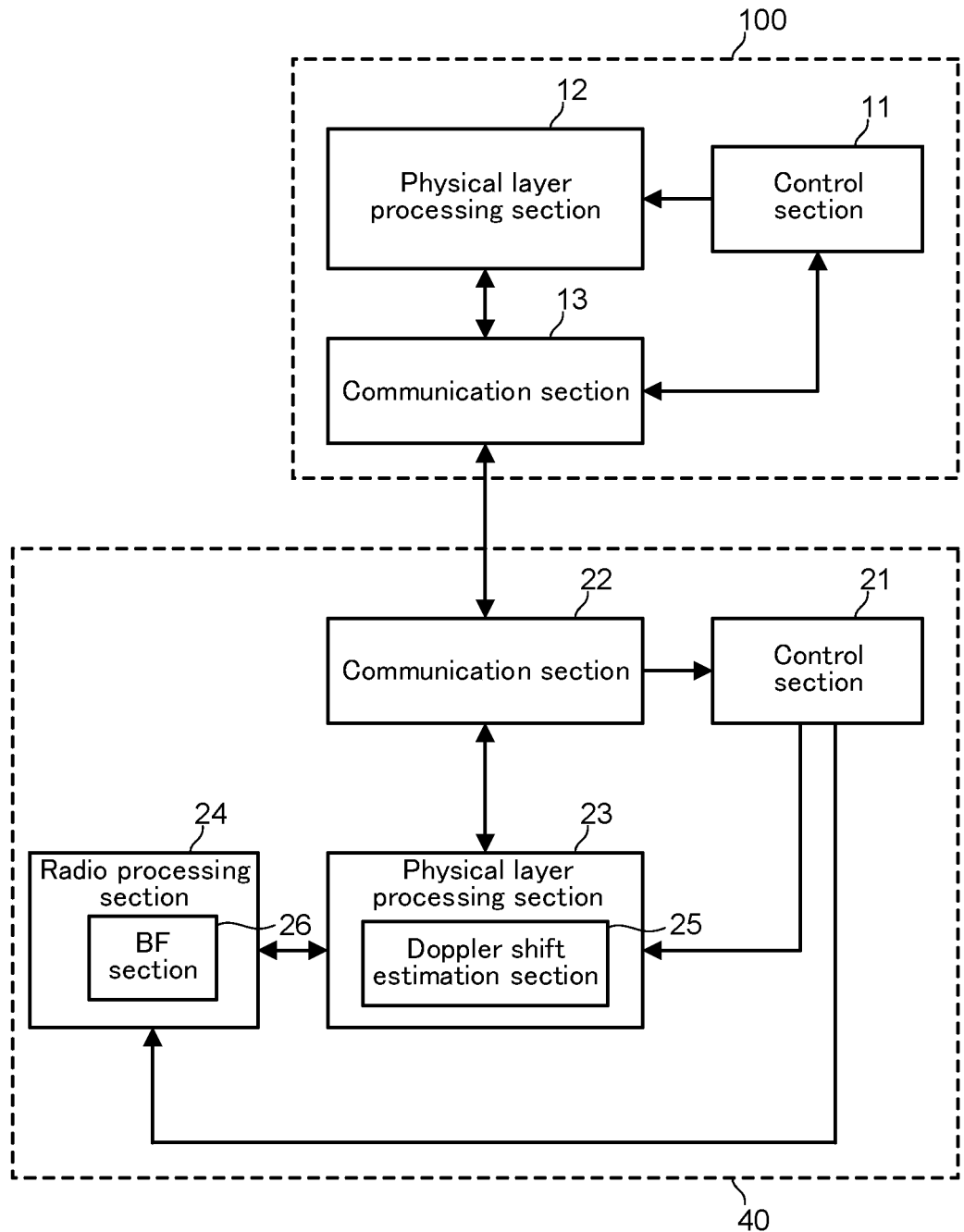
FIG. 4 illustrates an example of a configuration of a base station and a core apparatus according to the present disclosure.

FIG. 4 illustrates an example of a configuration of base station 40 and core apparatus 100 according to the present disclosure. For simplicity, FIG. 4 focuses on one base station 40.

Base station (base station cell or cell) 40 includes, for example, control section 21, communication section 22, physical layer processing section 23, and radio processing section 24. Physical layer processing section 23 includes, for example, Doppler shift estimation section 25. Radio processing section 24 includes, for example, beamforming (BF) section 26.

For example, in accordance with a DL transmission instruction signal inputted from communication section 22, control section (control circuit) 21 instructs physical layer processing section 23 to perform physical layer processing on a DL signal to mobile station 10, and also instructs radio processing section 24 to perform DL radio transmission. Here, the DL transmission instruction signal is a signal for instructing base station 40 to perform transmission of the DL signal to mobile station 10, and is one example of a control signal.

Further, for example, in accordance with a reference signal (RS) transmission instruction signal inputted from communication section 22, control section 21 instructs physical layer processing section 23 to perform physical layer processing on the DL signal in which an RS is mapped to time resources, and instructs radio processing section 24 to perform DL radio transmission. Here, the RS transmission instruction signal is a signal for instructing base station 40 to perform transmission of the DL signal in which the RS is mapped to the time resources, and is one example of a control signal.

Communication section 22 includes, for example, a transmission circuit and a reception circuit, and transmits and receives a signal to and from core apparatus 100. For example, an FH interface may be applied as communication section 22. Communication section 22 receives Doppler information from Doppler shift estimation section 25 and transmits the Doppler information to core apparatus 100. Further, communication section 22, for example, transmits a UL signal inputted from physical layer processing section 23 to core apparatus 100. Further, communication section 22 receives the RS transmission instruction signal and DL transmission instruction signal from core apparatus 100, and outputs the RS transmission instruction signal and DL transmission instruction signal to control section 21. Further, communication section 22 receives the DL signal from core apparatus 100 and outputs the DL signal to physical layer processing section 23, for example.

Physical layer processing section 23 exemplarily includes a signal processing circuit. For example, in accordance with an instruction from control section 21, physical layer processing section 23 performs physical layer processing on the DL signal inputted from communication section 22. Physical layer processing section 23 outputs the processed DL signal to radio processing section 24. Further, physical layer processing section 23 performs physical layer processing on the UL signal inputted from radio processing section 24, for example. Physical layer processing section 23 outputs the processed UL signal to communication section 22.

For example, radio processing section 24 performs radio processing on a radio signal received from mobile station 10 and outputs the processed UL signal to physical layer processing section 23. The radio processing on the UL signal may include, for example, beamforming (BF) and Analog to Digital (A/D) conversion. Further, for example, in accordance with an instruction from control section 21, radio processing section 24 performs radio processing on the DL signal inputted from physical layer processing section 23, and transmits the processed signal to mobile station 10. The radio processing on the DL signal may include, for example, Digital to Analog (D/A) conversion, and BF.

Doppler shift estimation section 25 estimates a Doppler shift, for example, based on the UL signal inputted from physical layer processing section 23 (e.g., UL RS). The UL RS may be, for example, a sounding reference signal (SRS). The information indicating the estimated Doppler shift (Doppler information) is outputted to, for example, communication section 22.

BF section 26 performs beamforming processing on the DL signal. BF section 26 includes at least one of an analog beamforming circuit that performs beamforming processing on the DL signal having been subjected to the D/A conversion, and digital beamforming circuit that performs beamforming processing on the DL signal yet to be subjected to the D/A conversion.

Core apparatus 100 includes, for example, control section 11, physical layer processing section 12, and communication section 13.

For example, based on the Doppler information inputted from base station 40, control section (control circuit) 11 determines a mapping method (hereinafter, referred to as "RS design") for mapping the RS to the time resources of the DL signal, and a beam (e.g., beam number, precoding weight, and the like) used for transmission of the DL signal in which the RS is mapped.

A target RS for the RS design is, for example, at least one of a beam reference signal (BRS) and a CSI measurement RS. The BRS and CSI measurement RS are referred to as "estimation reference signal (ERS)" for convenience. The BRS is a reference signal used for beam control (e.g., for specifying or identifying a reception beam by mobile station 10).

The BRS may be replaced by, for example, a synchronization signal (SS) or a channel-state information reference signal (CSI-RS) in 5th Generation (5G) New Radio (NR). The application of the CSI measurement RS is not limited to CSI measurement, but may also be used for phase noise compensation, for example. The ERS may include, for example, a demodulation reference signal (DMRS) and a phase-tracking reference signal (PTRS) in 5G NR.

Control section 11 instructs physical layer processing section 12 to generate an RS based on the determined RS design, for example. Further, control section 11 outputs, to communication section 13, a control signal (e.g., RS transmission instruction signal) for instructing base station 40 to transmit the generated RS.

Further, for example, based on a CSI report from mobile station 10, control section 11 outputs, to communication section 13, a control signal (for example, DL transmission instruction signal) for controlling transmission of the DL signal addressed to mobile station 10.

Physical layer processing section 12 includes, for example, a signal processing circuit. In accordance with an instruction of control section 11, physical layer processing section 12 performs physical layer processing on the UL signal inputted from communication section 13. Further, physical layer processing section 12 performs physical layer processing on the DL signal, for example, in accordance with an instruction of control section 11. The processed DL signal is outputted to, for example, communication section 13.

Communication section 13 includes, for example, a transmission circuit and a reception circuit, and transmits and receives signals to and from base stations 40. For example, an FH interface may be applied as communication section 13. For example, communication section 13 receives Doppler information from base station 40 and outputs the Doppler information to control section 11. Further, communication section 13 receives the UL signal from base station 40 and outputs the UL signal to physical layer processing section 12. Further, communication section 13 receives the DL signal from physical layer processing section 12 and transmits the DL signal to base station 40. Further, communication section 13 receives the RS transmission instruction signal or DL transmission instruction signal from control section 11 and transmits the RS transmission instruction signal or DL transmission instruction signal to base station 40.

One Example of Operation according to Present Disclosure

Figure 5:
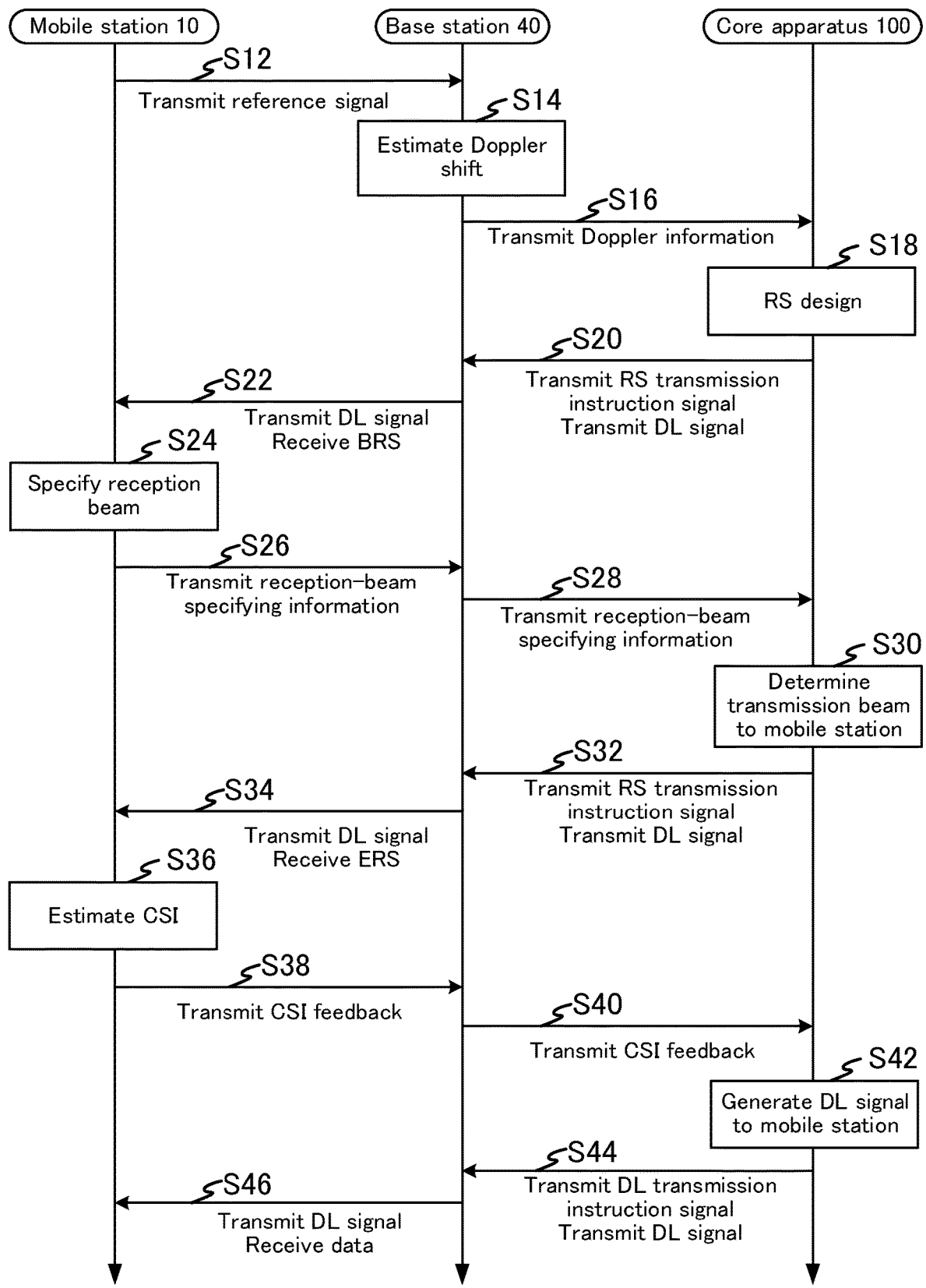
FIG. 5 is a sequence diagram illustrating an example of the operation of the mobile station, the base station, and the core apparatus according to the present disclosure.

FIG. 5 is a sequence diagram illustrating an example of the operation of mobile station 10, base station 40, and core apparatus 100 according to the present disclosure. Note that, depending on exemplary embodiments according to the present disclosure, at least one step in the sequence illustrated in FIG. 5 may be omitted. In addition, the order of steps included in the sequence illustrated in FIG. 5 is merely an example of the order of the operation performed by mobile station 10, base station 40, and core apparatus 100. The steps included in the sequence diagram may be performed in parallel with or concurrently with other steps, or the order of execution may be interchanged with other steps. The steps included in the sequence illustrated in FIG. 5 may also possibly be divided into a plurality of steps. The same applies to the flowchart illustrated in FIG. 7, 11, 14, or 16, and the sequence diagram illustrated in FIG. 18.

Reference is made to FIG. 5. In step S12, radio processing section 24 of base station 40 receives an UL radio signal including a reference signal from mobile station 10. The UL reference signal is used to estimate the Doppler shift. In one example, the UL reference signal is the SRS. The SRS is used, for example, for channel estimation for UL adaptive radio link control (e.g., for determining precoding weight, and/or determining a modulation scheme). In another example, the reference signal may be the demodulation reference signal (DMRS). Further, in still another example, the reference signal may be a known signal transmitted by mobile station 10 upon request of base station 20 or base station 40. The known signal is a signal known between base station 40 and mobile station 10.

In step S14, Doppler shift estimation section 25 of base station 40 estimates the Doppler shift of the radio signal based on the reference signal received from mobile station 10. In one example, Doppler shift estimation section 25 estimates the Doppler shift based on the correlation between orthogonal frequency division multiplexing (OFDM) symbols included in the reference signal. In another example, Doppler shift estimation section 25 estimates the Doppler shift based on the correlation between cyclic prefixes (CPs) of the OFDM symbols included in the radio signal. Doppler shift estimation section 25 may estimate the Doppler shift based on multiple types of reference signals.

In step S16, communication section 22 of base station 40 transmits Doppler information indicating the estimated Doppler shift to core apparatus 100. In core apparatus 100, the Doppler information is inputted to control section 11 via communication section 13.

In step S18, based on the estimated Doppler information, control section 11 of core apparatus 100 performs mapping (or assignment) of the RS to the beam that is to be transmitted from base station 40. Note that, in the following, designations "thick beam" and "sharp beam" with respect to beams transmitted by base station 40 may be used differentially for convenience. The "thick beam" means, for example, a beam that, by assignment of the same RS to a plurality of beams, virtually extends a spatial range within which mobile station 10 receives temporally the same RS, as compared to a case where different RSs are assigned to individual beams. In contrast to this "thick beam," the "sharp beam" means an individual beam to which a different RS is assigned (in other words, to which the same RS is not assigned).

Figure 6:
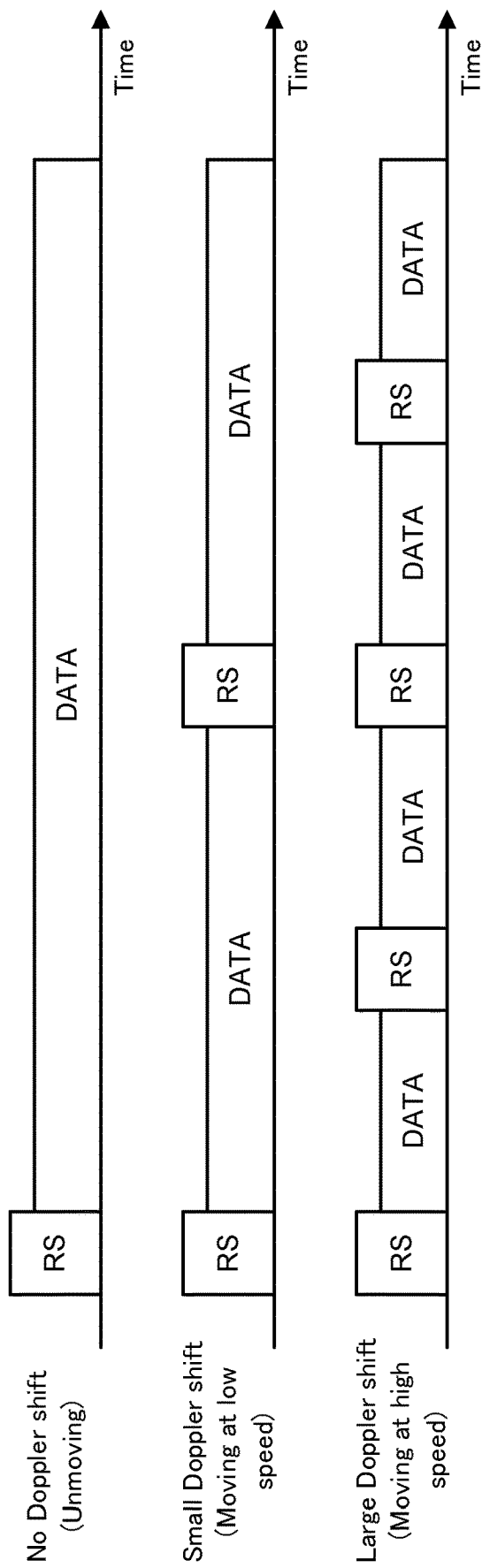
FIG. 6 illustrates examples of a reference signal (RS) design.

FIG. 6 illustrates examples of the RS design.

FIG. 6 illustrates a plurality of RS designs dependent on different magnitudes of the Doppler shift. In one example, the slower the moving speed of mobile station 10 (i.e., the smaller the magnitude of the estimated Doppler shift), the smaller the number of RSs mapped to time resources per unit time. In other words, the RS transmission frequency decreases, or the RS transmission periodicity (or RS insertion interval) becomes longer. Accordingly, the RS transmission periodicity is adjusted depending on the moving state of mobile station 10. In one example, as illustrated in FIG. 6, a signal of a data channel (which may be referred to as "data signal") may be mapped to a time resource to which no RS is mapped. The longer the RS transmission periodicity, the more the time resources to which the data signal can be mapped. It is thus possible to increase the data throughput.

Reference is made again to FIG. 5. In step S20, communication section 13 of core apparatus 100 transmits, to base station 40, for example, a control signal for mapping the RS to DL time resources in accordance with the RS design for transmission of the RS.

Control section 21 of base station 40 receives the control signal from core apparatus 100 via communication section 22. Control section 21 performs mapping of one or both of the RS and data in accordance with the received control signal. Code multiplexing for allowing individual beams to be identified (or specified) even when the same RS is assigned to a plurality of beams may be performed on the RS. An example of this code multiplexing will be described later. Note that, core apparatus 100 may transmit a DL signal obtained by mapping the RS in physical layer processing section 12 to base station 40.

In step S22, mobile station 10 receives the DL RS (e.g., BRS) transmitted by base station 40.

In step S24, based on the received BRS, mobile station 10 specifies (or identifies or selects) a beam suitable for reception by mobile station 10. Depending on the moving speed of mobile station 10, the reception beam specified is, for example, one sharp beam or a beam bundle (which may be referred to as "beam group") including a plurality of sharp beams.

In step S26, mobile station 10 transmits information on the specified reception beam (reception-beam specifying information) to base station 40. In step S28, base station 40 transmits the reception-beam specifying information received from mobile station 10 to core apparatus 100.

In step S30, based on the reception-beam specifying information received from mobile station 10, core apparatus 100 determines a beam (transmission beam) to be used by base station 40 for transmitting the data to mobile station 10. The transmission beam determined is, for example, one sharp beam or a beam bundle including a plurality of sharp beams.

In step S32, communication section 13 of core apparatus 100 transmits, to base station 40, a DL signal processed by physical layer processing section 12 and an RS (e.g., ERS) transmission instruction signal inputted from control section 11. Base station 40 (e.g., physical layer processing section 23) maps one or both of the ERS and DL signal to the DL radio resources. Note that, core apparatus 100 may transmit, to base station 40, the DL signal in which the RS is mapped by physical layer processing section 12.

In step S34, mobile station 10 receives the ERS transmitted by base station 40. In step S36, based on the received ERS, mobile station 10 estimates (or measures) the CSI between mobile station 10 and base station 40 being a transmitter of the ERS.

In step S38, mobile station 10 transmits a report of the estimated CSI to base station 40. In step S40, base station 40 transmits the CSI report received from mobile station 10 to core apparatus 100.

In step S42, core apparatus 100 generates a DL signal including a data signal addressed to mobile station 10. In step S44, for example, control section 11 of core apparatus 100 instructs base station 40 via communication section 13 to assign the beam determined in step S30 to the data transmission addressed to mobile station 10. In accordance with the instruction from core apparatus 100, control section 21 of base station 40 assigns the transmission beam determined in step S30, for example, to transmission of the DL signal addressed to mobile station 10. Further, for example, in accordance with control of core apparatus 100 based on the CSI report, physical layer processing section 23 of base station 40 generates a transmission precoding weight for reducing mutual interference between terminals including mobile station 10, and applies the transmission precoding weight to the data signal addressed to mobile station 10.

In step S46, base station 40 transmits the DL signal to mobile station 10 using the assigned beam in accordance with the DL transmission instruction signal. Mobile station 10 receives the DL signal transmitted using the beam by base station 40.

Embodiment 1

Figure 7:
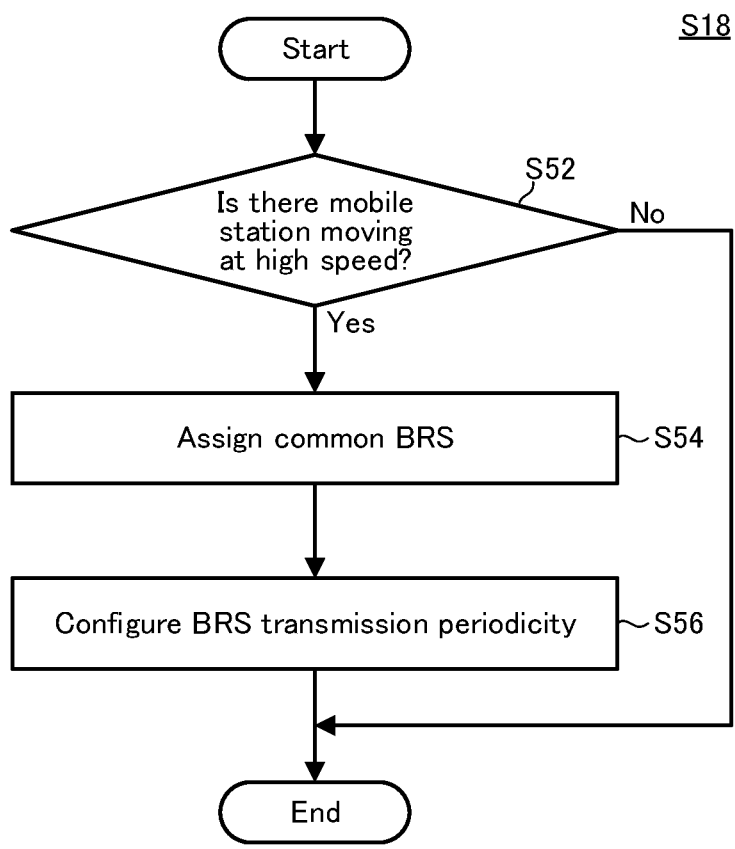
FIG. 7 is a flowchart illustrating an example of the operation of the core apparatus according to Embodiment 1.

FIG. 7 is a flowchart illustrating an example of the operation of core apparatus 100 according to Embodiment 1. The flowchart illustrated in FIG. 7 illustrates an example of the operation performed in step S18 of FIG. 5.

In step S52, control section 11 of core apparatus 100 determines whether or not there is mobile station 10 moving at high speed. In one example, when the magnitude of the Doppler shift estimated by Doppler shift estimation section 25 exceeds a predetermined magnitude, control section 11 determines that mobile station 10 is moving at high speed.

When there is no mobile station 10 moving at high speed (step S52: No), step S18 ends. In this case, different BRSs are transmitted from base station 40 in a plurality of sharp beams, respectively. In other words, a common BRS is not shared among a plurality of sharp beams.

Figure 8A:
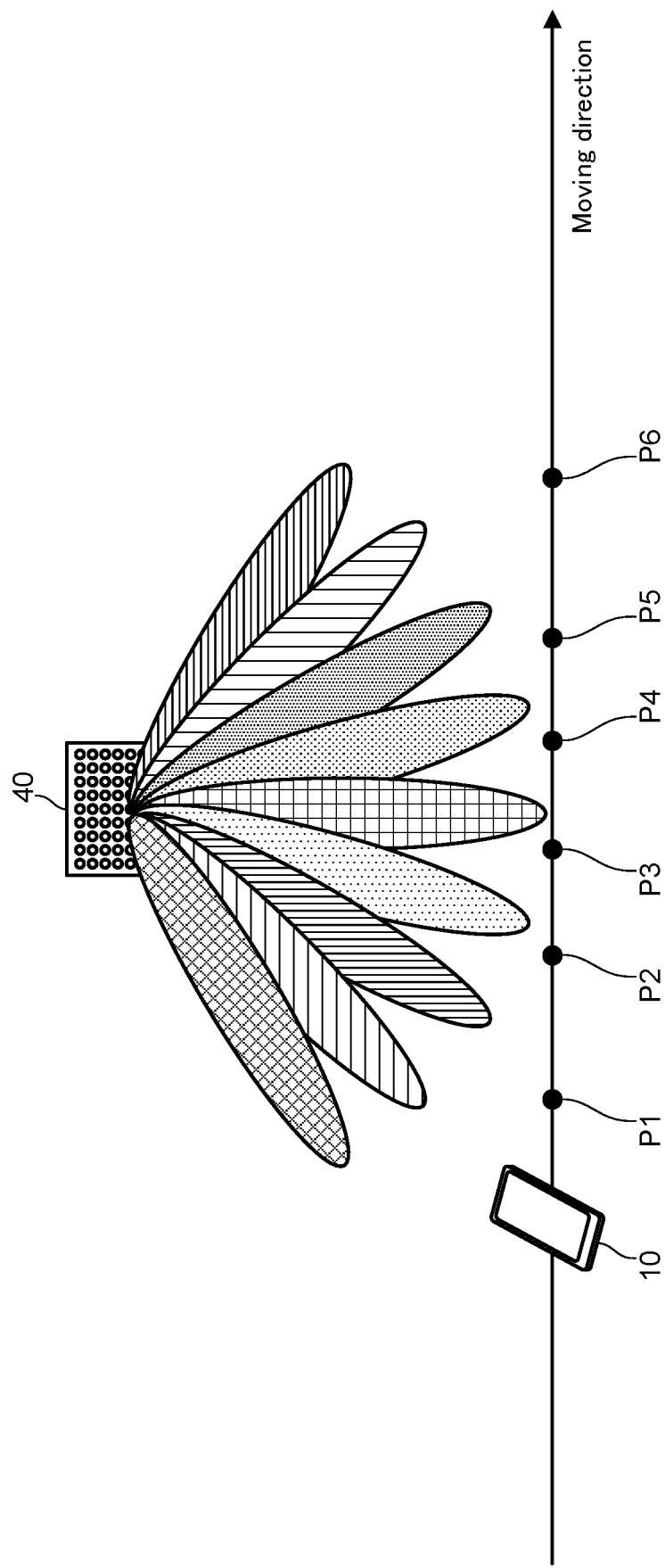
FIG. 8A illustrates an example of beams generated by the base station according to Embodiment 1.

FIG. 8A illustrates an example of beams generated by the base station according to Embodiment 1. FIG. 8B illustrates an example of RS design D1 determined for base station 40 according to Embodiment 1.

As illustrated in FIG. 8B, in RS design D1 determined for base station 40, the BRS is mapped to the DL time resources with a predetermined periodicity (first periodicity). In other words, the BRS is transmitted with a predetermined transmission periodicity. For example, when mobile station 10 illustrated in FIG. 8A moves at low speed, it is possible for mobile station 10 to specify sharp reception beams even when switching of the reception beams occurs, for example, at points P1 to P6. It is thus possible for base station 40 to use sharp beams for data transmission to mobile station 10, as illustrated in FIG. 8A, to improve communication performance (e.g., throughput).

On the other hand, when there is mobile station 10 moving at high speed (step S52: Yes), control section 11 determines, in step S54, an RS design for transmitting the same BRS in a plurality of sharp beams. In other words, the common BRS is shared among a plurality of sharp beams, and a plurality of sharp beams are virtually treated as one thick beam. In step S56, for example, control section 11 configures the transmission periodicity of BRS in the thick beam to a periodicity (second periodicity) longer than the predetermined periodicity (first periodicity). This periodicity configuration reduces the number of BRS transmissions.

It is thus possible to reduce radio overhead. Note that, a reduced number of BRS transmissions may allow the data signal (or another RS as described later) to be mapped to the time resources for which the BRS transmission (or BRS mapping) is scheduled in the case of the first periodicity.

Figure 9B:
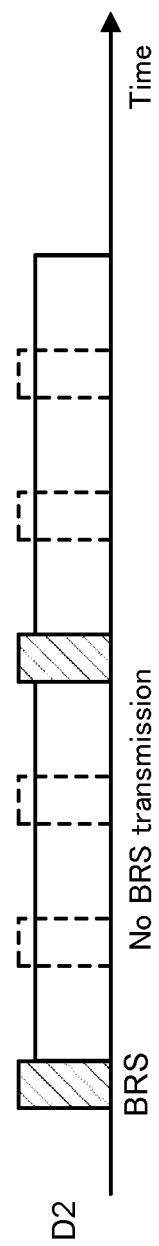
FIG. 9B illustrates an example of the RS design determined for the base station according to Embodiment 1.

FIG. 9A illustrates an example of beams generated by base station 40 according to Embodiment 1. FIG. 9B illustrates an example of RS design D2 determined for base station 40 according to Embodiment 1.

According to Embodiment 1, for example, as illustrated in FIG. 9A, when there is mobile station 10 moving at high speed, the common BRS is shared among a plurality of sharp beams included in each of beam bundles B1, B2, and B3. Accordingly, even when mobile station 10 moves at high speed, mobile station 10 is capable of reducing the switching frequency of the reception beam. For example, mobile station 10 is capable of reducing switching between a plurality of sharp beams included in any of beam bundles B1, B2, and B3. For example, among points P1 to P6 illustrated in FIG. 9A, mobile station 10 does not have to switch between the reception beams at points P1, P3, P4, and P6. It is thus possible, for example, to improve the durability or reliability of communication between mobile station 10 and base station 40. In addition, as illustrated in FIG. 9B, sharing the common BRS among a plurality of sharp beams allows reduction in the BRS transmission frequency. Consequently, it is possible, for example, to map the data signal to the time resources for which the BRS was scheduled before the reduction, so as to improve the resource utilization efficiency and the data throughput.

Modification 1

Embodiment 1 focuses on one base station 40. Next, attention is paid to a case where mobile station 10 passes across multi-cells (a plurality of base station cells 40).

Figure 10:
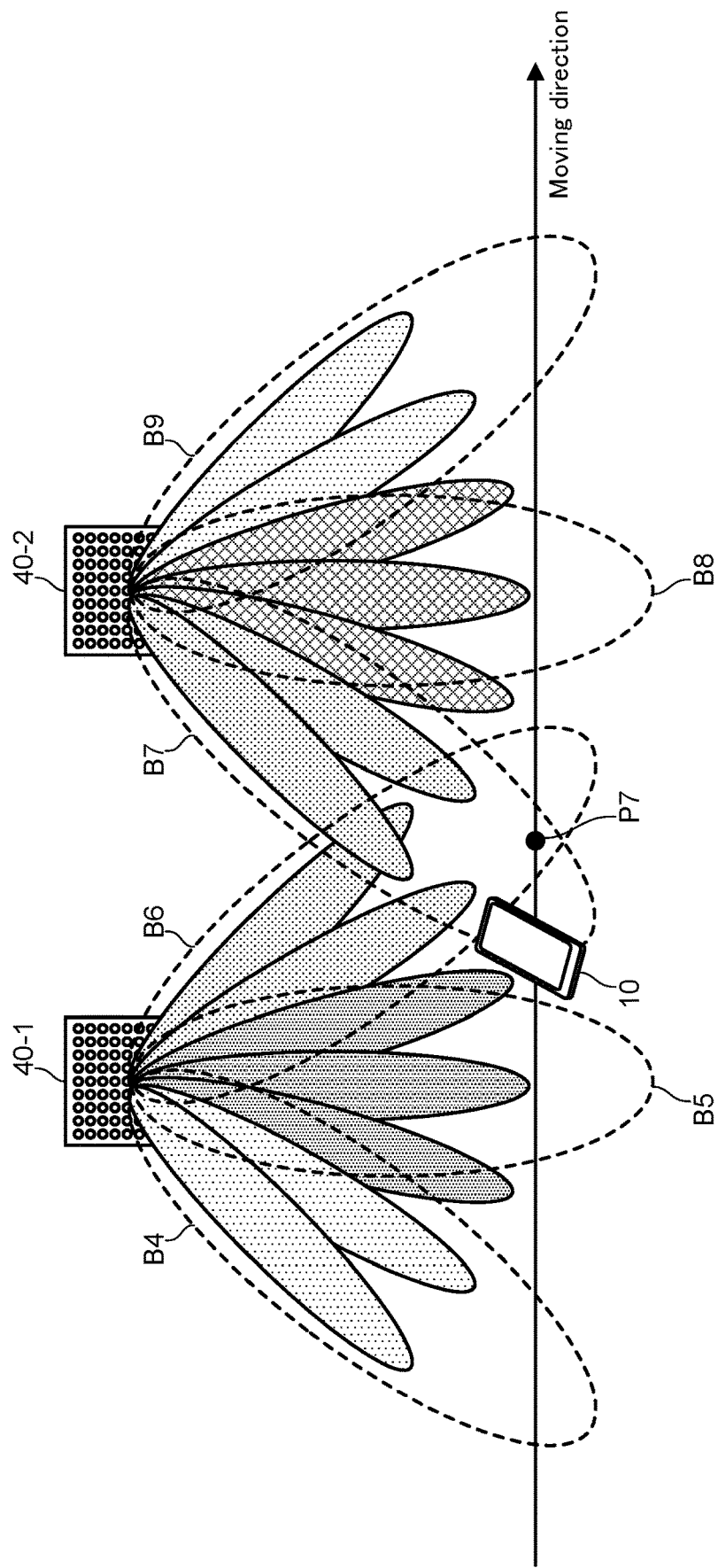
FIG. 10 illustrates an example of beams generated by the base station according to Embodiment 2.

FIG. 10 illustrates an example of beams generated by the base station cells according to Embodiment 2. Two base stations 40-1 and 40-2 are connected to core apparatus 100 (not illustrated). As illustrated in FIG. 10, mobile station 10 moves across the cells of two base stations 40-1 and 40-2.

In step S18 of FIG. 5, core apparatus 100 may assign the same BRS to a plurality of beams (e.g., beam bundles B6 and B7) that are transmitted, for example, toward a region where two base station cells 40-1, 40-2 overlap. Thus, beam bundles B6 and B7 transmitted by two base stations 40-1 and 40-2 are virtually treated as one thick beam.

In addition, in step S18 of FIG. 5, core apparatus 100 may assign the same BRS to a plurality of beams (e.g., beam bundles B4 and B9) of the plurality of beams (e.g., beam bundles B4 to B9) which do not interfere with each other (or interfere the least with each other). This assignment makes it possible to reuse the same BRS between a plurality of base stations 40. Accordingly, it is possible to improve the utilization efficiency of radio resources used for the BRS transmission.

According to Modification 1, the common BRS is shared among a plurality of beams transmitted by a plurality of base stations 40. It is thus possible to reduce the BRS transmission frequency for each of the plurality of base stations 40. Further, a plurality of beams (e.g., beam bundles B6 and B7) are treated as the same beam in the region where two base station cells 40-1 and 40-2 overlap. It is thus possible to achieve smooth cell switching (in other words, handover) within the region (e.g., at point P7). Furthermore, since a plurality of beams are treated as one beam in the region where two base station cells 40-1 and 40-2 overlap, it is possible to reduce the occurrence of inter-cell interference.

Embodiment 2

Embodiment 1 and Modification 1 described above focus on mobile station 10 moving at high speed. Next, attention is paid to a case where mobile station 10 moving at high speed and mobile station 10 unmoving or moving at low speed exist together.

Figure 11:
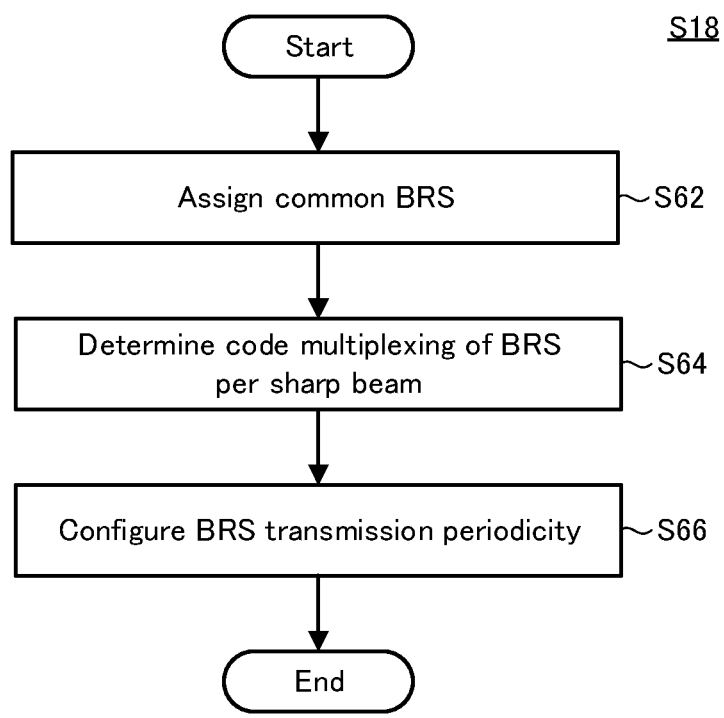
FIG. 11 is a flowchart illustrating an example of the operation of the core apparatus according to Embodiment 2.

FIG. 11 is a flowchart illustrating an example of the operation of core apparatus 100 according to Embodiment 2. The flowchart illustrated in FIG. 11 is an example of the operation performed in step S18 of FIG. 5.

In step S62, control section 11 of core apparatus 100 assigns the same BRS to a plurality of sharp beams. In other words, the common BRS is shared among the plurality of sharp beams, and the plurality of sharp beams are virtually treated as one thick beam.

Figure 12A:
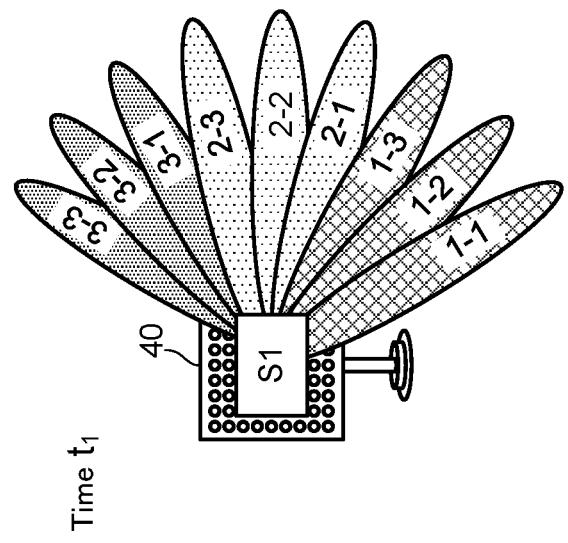
FIG. 12A illustrates an example of beams generated by the base station according to Embodiment 2.
Figure 12B:
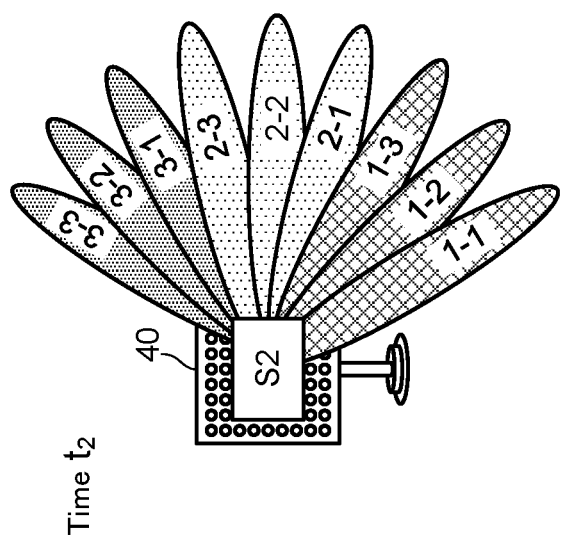
FIG. 12B illustrates an example of beams generated by the base station according to Embodiment 2.
Figure 12C:
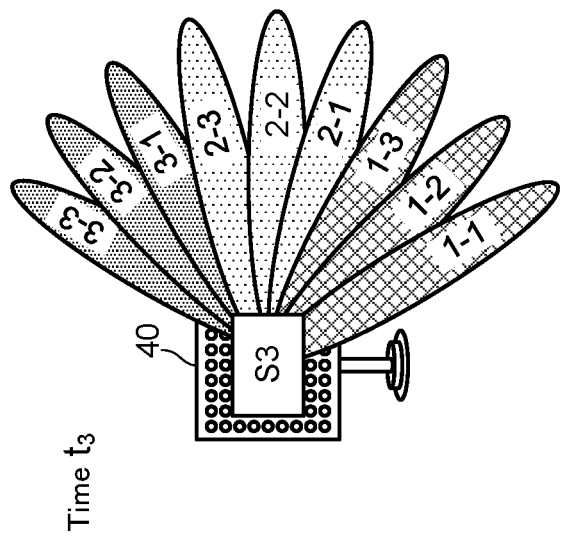
FIG. 12C illustrates an example of beams generated by the base station according to Embodiment 2.

FIGS. 12A to 12C illustrate examples of beam X-Y (X=1, 2, or 3 and Y=1, 2, or 3) generated by base station 40 according to Embodiment 2. FIGS. 12A to 12C illustrate beams X-Y (X=1, 2, or 3 and Y=1, 2, or 3) transmitted respectively at time $t_1$, $t_2$, and $t_3$.

When step S62 is performed, for each of X=1, 2, and 3, the same BRS is assigned to sharp beams X-1, X-2, and X-3 illustrated in FIGS. 12A to 12C, for example. Consequently, for each of X=1, 2 and 3, a plurality of sharp beams X-1, X-2, and X-3 are treated virtually as one thick beams.

Reference is made to FIG. 11 again. In step S64, control section 11 of core apparatus 100 determines code multiplexing of the BRS in the time axis (time domain). For example, control section 11 determines to multiplex the BRS with different codes at respective different times that are different per sharp beam. By code multiplexing, for example, mobile station 10 is capable of selectively identifying the thick beam (beam bundle) and the sharp beams (individual beams included in the beam bundle).

For example, the BRSs transmitted by the beams illustrated in FIGS. 12A to 12C are BRSs S1, S2, and S3 in which BRSs for the sharp beams are code-multiplexed with codes in the time axis. It is possible for mobile station 10 to specify, based on at least one of code-multiplexed BRSs S1, S2, and S3, X of reception beams X-Y (X=1, 2, or 3 and Y=1, 2, or 3) for identifying the beam bundle. It is also possible for mobile station 10 to specify, based on all of code-multiplexed BRSs S1, S2, and S3, X of reception beams X-Y (X=1, 2, or 3 and Y=1, 2, or 3) for identifying the beam bundle and Y for identifying the sharp beams in the beam bundle. For example, mobile station 10 moving at high speed specifies beam bundle (X) and mobile station 10 unmoving or moving at low speed specifies sharp beams (Y) in beam bundle (X).

Reference is made to FIG. 11 again. In step S66, control section 11 of core apparatus 100 configures the transmission periodicity of the shared common BRS in the RS design to a periodicity (second periodicity) longer than the predetermined periodicity (first periodicity). This periodicity configuration reduces the number of BRS transmissions. It is thus possible to reduce the radio overhead. Note that, a reduced number of BRS transmissions may allow the data signal (or another RS as described later) to be mapped to the time resources for which the BRS transmission (or BRS mapping) is scheduled in the case of the first periodicity.

Figure 13:
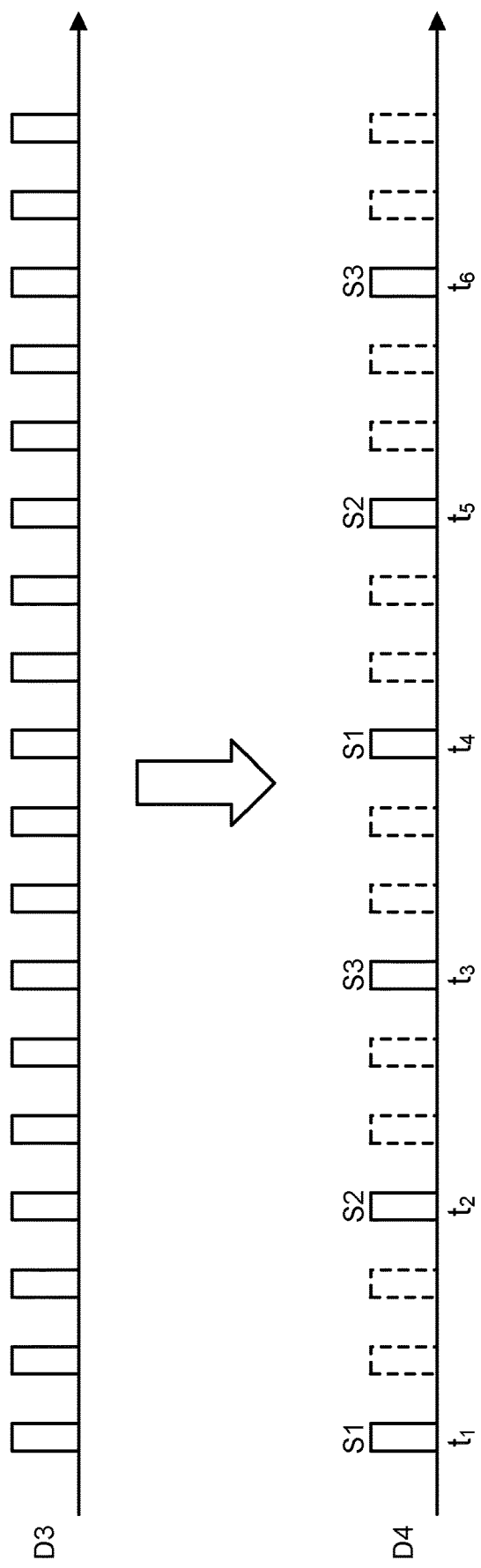
FIG. 13 illustrates an example of the RS design at the time of generation of the beams illustrated in FIGS. 12A to 12C.

FIG. 13 illustrates an example of the RS design at the time of generation of the beams illustrated in FIGS. 12A to 12C. As illustrated in FIG. 13, in RS design D4, code-multiplexed BRSs S1 to S3 are transmitted with a longer periodicity (e.g., at times $t_1$, $t_2$, $t_3$, $t_4$, $t_5$, and $t_6$) as compared with RS design D3 prior to assigning the common BRSs. Because of the longer periodicity of the BRSs, the time resources scheduled for transmission (mapping) before making longer the periodicity become free resources. In order to improve resource utilization efficiency, a data signal (or another RS) may be mapped to the free resources.

Figure 14:
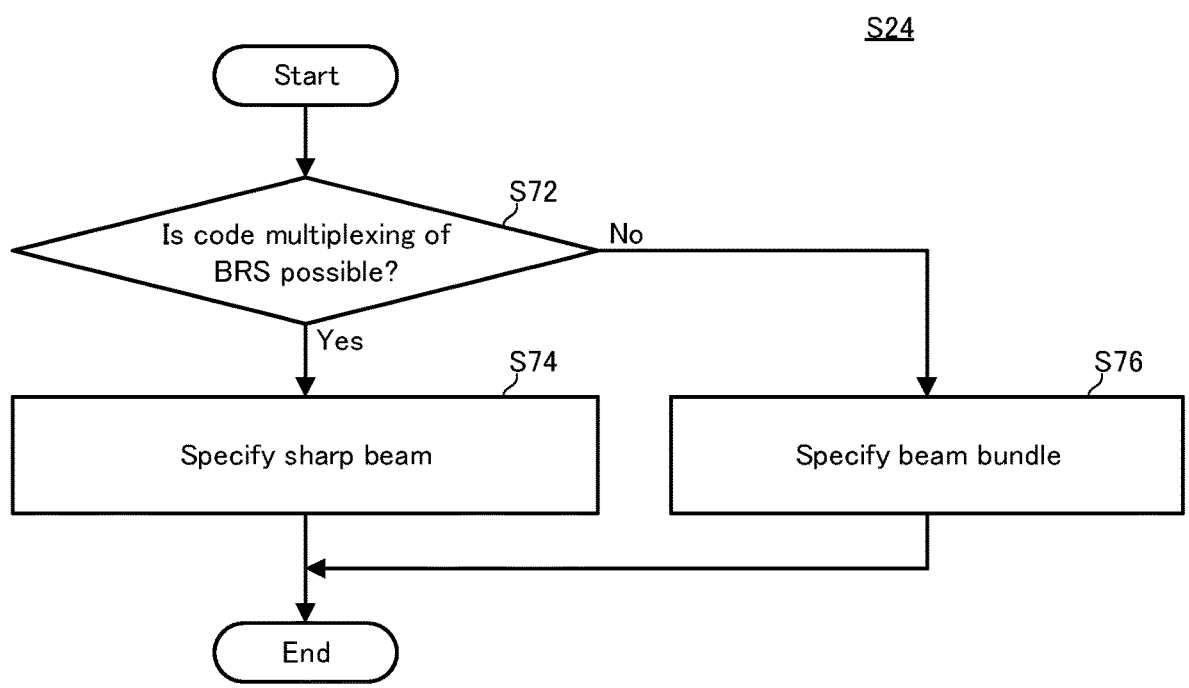
FIG. 14 is a flowchart illustrating an example of the operation of the mobile station according to Embodiment 2.

FIG. 14 is a flowchart illustrating an example of the operation of mobile station 10 according to Embodiment 2. The flowchart illustrated in FIG. 14 is an example of the operation performed in step S24 of FIG. 5.

In step S72, mobile station 10 determines whether or not code separation is possible for a code-multiplexed received BRS. For example, a description will be given, with reference to FIGS. 15A and 15B, of how mobile station 10 unmoving or moving at low speed is capable of the code separation while mobile station 10 moving at high speed fails to perform the code separation.

Figure 15A:
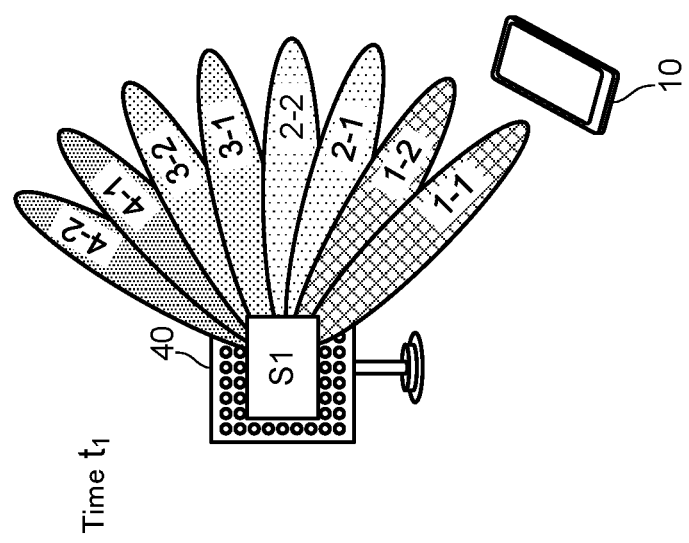
FIG. 15A illustrates another example of the beams generated by the base station according to Embodiment 2.
Figure 15B:
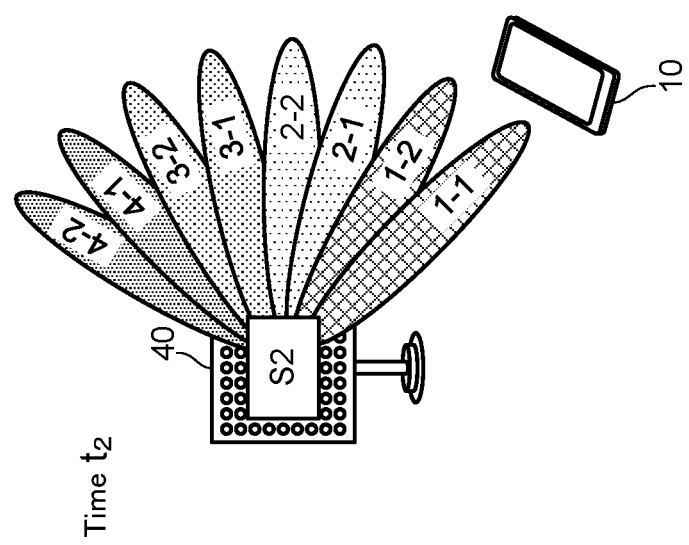
FIG. 15B illustrates still another example of the beams generated by the base station according to Embodiment 2.

FIGS. 15A and 15B illustrate other examples of beam X-Y (X=1 to 4 and Y=1 or 2) generated by base station 40 according to Embodiment 2. FIGS. 15A and 15B illustrate beams X-Y (X=1 to 4 and Y=1 or 2) transmitted at times $t_1$ and $t_2$, respectively.

At time $t_1$, base station 40 transmits, by beam 1-1, a BRS code-multiplexed with value s and transmits, by beam 1-2, BRS S1 code-multiplexed with value s. In addition, at time $t_2$, base station 40 transmits, by beam 1-1, the BRS code-multiplexed with value s and transmits, by beam 1-2, BRS S2 code-multiplexed with value –s.

In this case, when a reception signal received by mobile station 10 at time t is represented by y(t) and a channel of beam i-j at time t is represented by $h_{i-j}(t)$, following Equations 1 and 2 hold:

$$y(t_1) = h_{1-1}(t_1)s + h_{1-2}(t_1)s \qquad \text{(Equation 1)}$$

$$y(t_2) = h_{1-1}(t_2)s - h_{1-2}(t_2)s \qquad \text{(Equation 2)}.$$

Reference is made to FIG. 14 again. When code separation of the BRS is possible (step S72: Yes), mobile station 10 specifies the sharp beam in step S74.

For example, when mobile station 10 is unmoving or moving at low speed, channel $h_{i-j}(t)$ does not change at times $t_1$ and $t_2$, that is, $h_{i-j}(t_1) = h_{i-j}(t_2)$ may hold true. Thus, $h_{1-1}(*)$ is obtained by addition of Equations 1 and 2. Further, $h_{1-2}(*)$ is obtained by subtracting Equation 2 from Equation 1. It is thus possible for mobile station 10 to specify, from $h_{1-1}(*)$ or $h_{1-2}(*)$, channel number i-j for the BRS, or in other words, beam number i-j (sharp beam).

On the other hand, when the code separation of the BRS is failed (step S72: No), mobile station 10 specifies one beam bundle based on the BRS in step S76.

For example, when mobile station 10 moves at high speed, channel $h_{i-j}(t)$ changes between times $t_1$ and $t_2$, that is, $h_{i-j}(t_1) \ne h_{i-j}(t_2)$. Thus, it is impossible to specify an individual channel number (i-j) by the addition or subtraction between Equations 1 and 2. However, from Equation 1 or 2, $h_{1-1}(*) + h_{1-2}(*)$ or $h_{1-1}(*) - h_{1-2}(*)$ is obtained in mobile station 10. It is thus possible to distinguish index i of the beam bundle. Therefore, it is possible for mobile station 10 moving at high speed to specify beam bundle (i).

After step S74 or step S76 is performed, mobile station 10 ends step S24 of FIG. 5.

Figure 16:
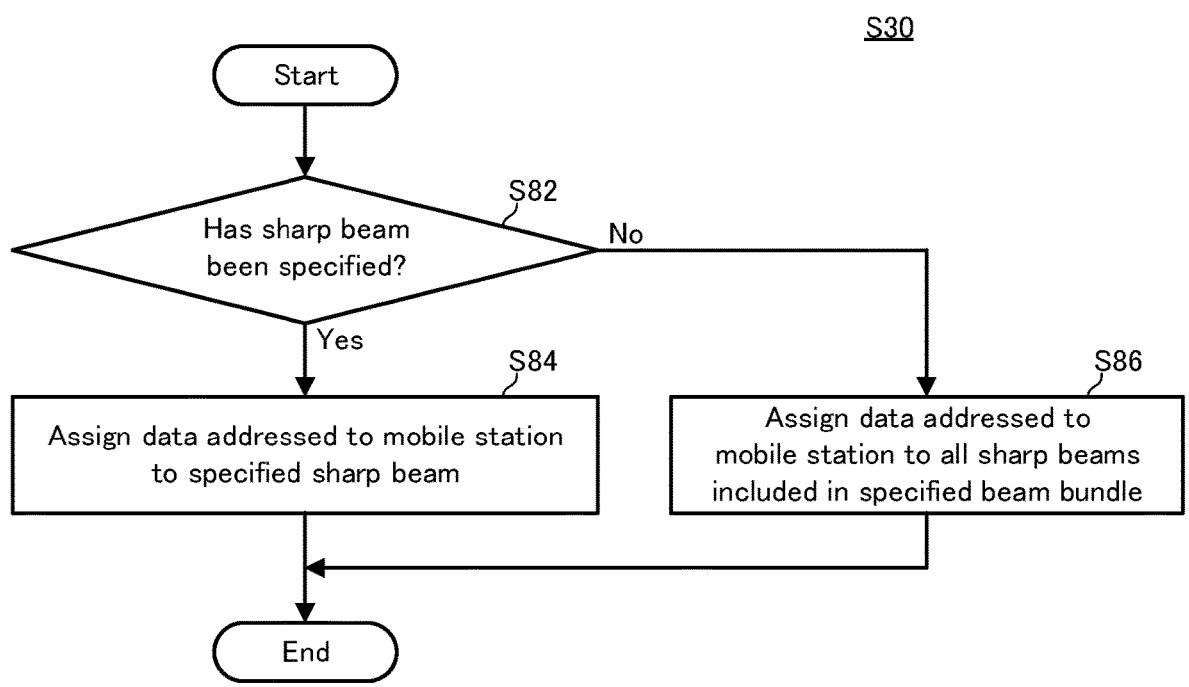
FIG. 16 is a flowchart illustrating an example of the operation of the core apparatus according to Embodiment 2.

FIG. 16 is a flowchart illustrating an example of the operation of core apparatus 100 according to Embodiment 2. The flowchart illustrated in FIG. 16 is an example of the operation performed in step S30 of FIG. 5.

In step S82, based on the reception-beam specifying information received from mobile station 10, core apparatus 100 determines whether or not a sharp beam has been specified.

When the sharp beam has been specified (step S82: Yes), core apparatus 100 assigns the specified sharp beam to the data transmission addressed to mobile station 10 in step S84. On the other hand, when the sharp beam has not been specified but the beam bundle is specified (step S82: No), control section 11 of core apparatus 100 assigns the specified beam bundle to the data transmission addressed to mobile station 10 in step S86.

After step S84 or S86 is performed, core apparatus 100 ends step S30 of FIG. 5.

Figure 17:
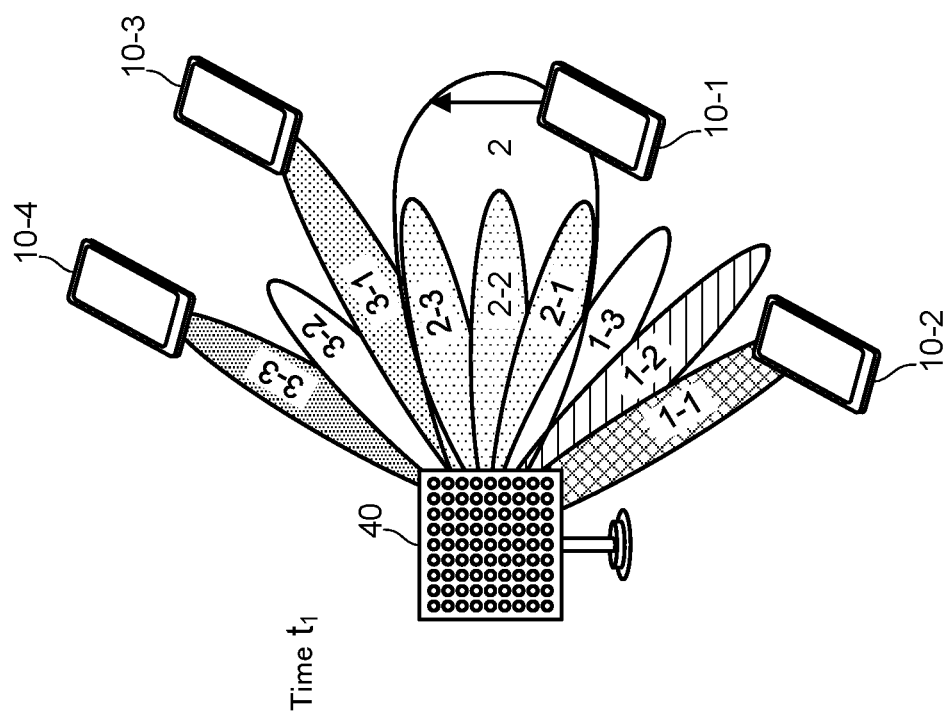
FIG. 17 illustrates even another example of the beams generated by the base station according to Embodiment 2.

FIG. 17 illustrates even another example of the beams generated by base station 40 according to Embodiment 2. At time $t_1$, mobile station 10-1 moving at high speed and unmoving mobile stations 10-2, 10-3, and 10-4 exist together in base station cell 40. In step S86 of FIG. 16, beam bundle 2 (beams 2-1, 2-2, and 2-3), which is a thick beam, is assigned to the data transmission addressed to mobile station 10-1 moving at high speed. On the other hand, in step S84 of FIG. 16, sharp beams 1-1, 3-1, and 3-3 are assigned to the data transmissions addressed to unmoving mobile stations 10-2, 10-3, and 10-4, respectively.

Thus, it is possible for mobile station 10-1 moving at high speed to use thick beam (beam bundle) 2.

When, for X=1, 2, and 3, base station 40 illustrated in FIG. 17 treats beams X-1, X-2, and X-3 as thick beams, the number of beams is 3. In contrast, sharp beams 1-1, 3-1, and 3-3 are used for data transmission to unmoving mobile stations 10-2, 10-3, and 10-4, and accordingly, the number of beams transmitted from base station 40 is 4 or more.

According to Embodiment 2, it is possible for mobile station 10-1 moving at high speed to use thick beam (beam bundle) 2. Therefore, for mobile station 10-1 moving at high speed, the beam is virtually expanded, and it is thus possible to reduce switching between the beams with the movement of mobile station 10-1. In addition, mobile stations 10-2, 10-3, and 10-4 moving at low speed can occupy the resources of sharp beams 1-1, 3-1, and 3-3, and thus, the communication performance (e.g., throughput) of the entire system is improved. Moreover, the use of sharp beams for mobile stations 10-2, 10-3, and 10-4 can reduce interference between adjacent beams or interference with neighboring cells.

Embodiment 3

In Embodiments 1 and 2 described above, by way of example, a data signal is assigned to the time resources in which the BRS is reduced. Unlike the above embodiments, in Embodiment 3, attention is paid, for example, to a case where the number of mobile stations 10 moving at high speed is greater than a threshold, and an ERS is assigned to a time resource in which the BRS is reduced.

Figure 18:
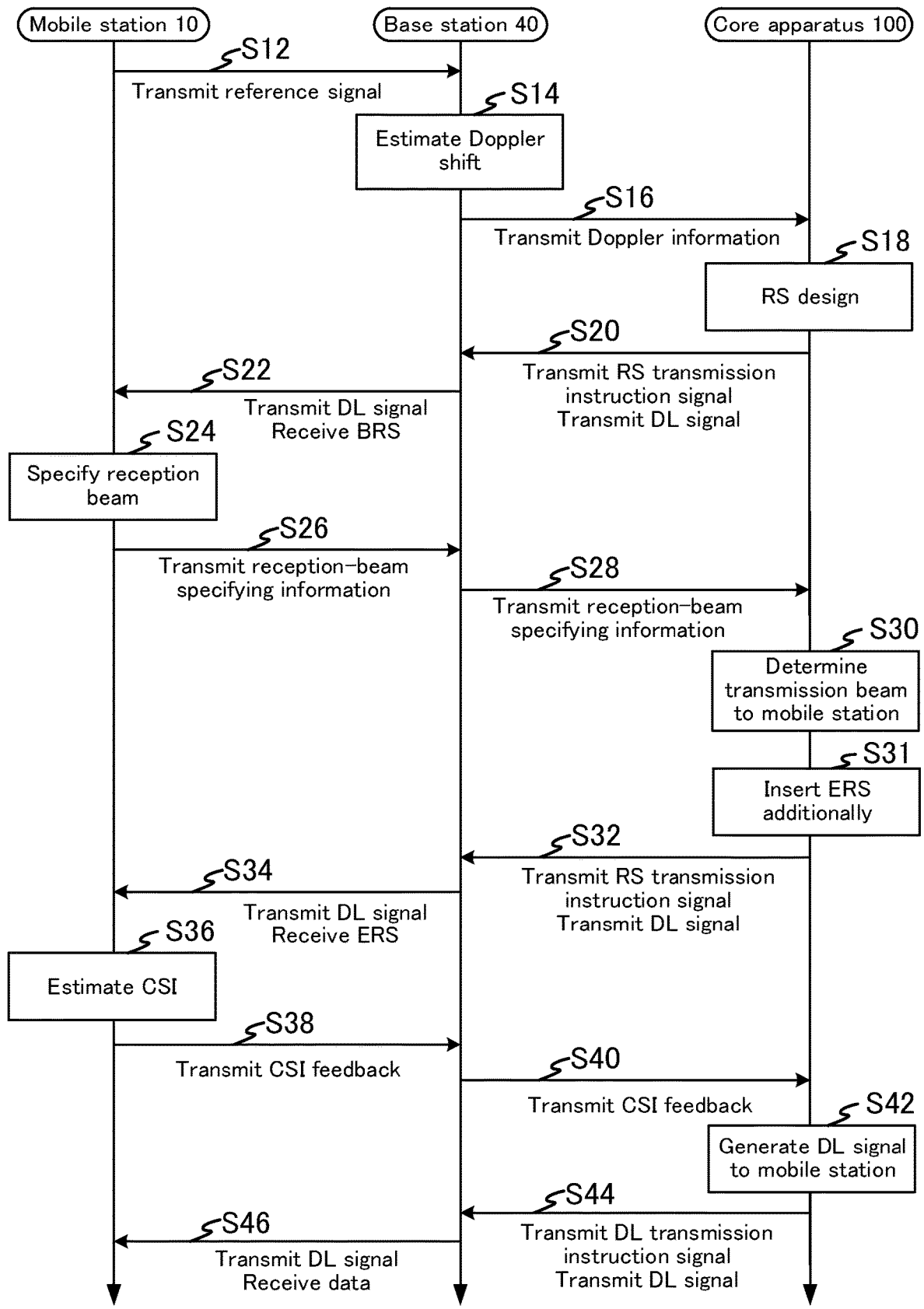
FIG. 18 is a sequence diagram illustrating an example of the operation of the mobile station, the base station, and the core apparatus according to Embodiment 3.

FIG. 18 is a sequence diagram illustrating an example of the operation of mobile station 10, base station 40, and core apparatus 100 according to Embodiment 3. FIG. 18 is different from FIG. 5 in step S31. The same portions between FIG. 18 and FIG. 5 are steps common between the present embodiment and Embodiment 1 or 2, and therefore, the description of such portions in FIG. 18 is omitted.

It is more preferable that base station 40 transmit, at a higher frequency than the frequency for the BRS used for beam switching, the ERS used for estimation of CSI that changes more quickly than beam switching. Accordingly, in step S31, control section 11 of core apparatus 100 may determine to map (add or insert) the ERS to free time resources generated by reduction in the BRS transmission frequency achieved by the RS design determined in step S18.

Figure 19:
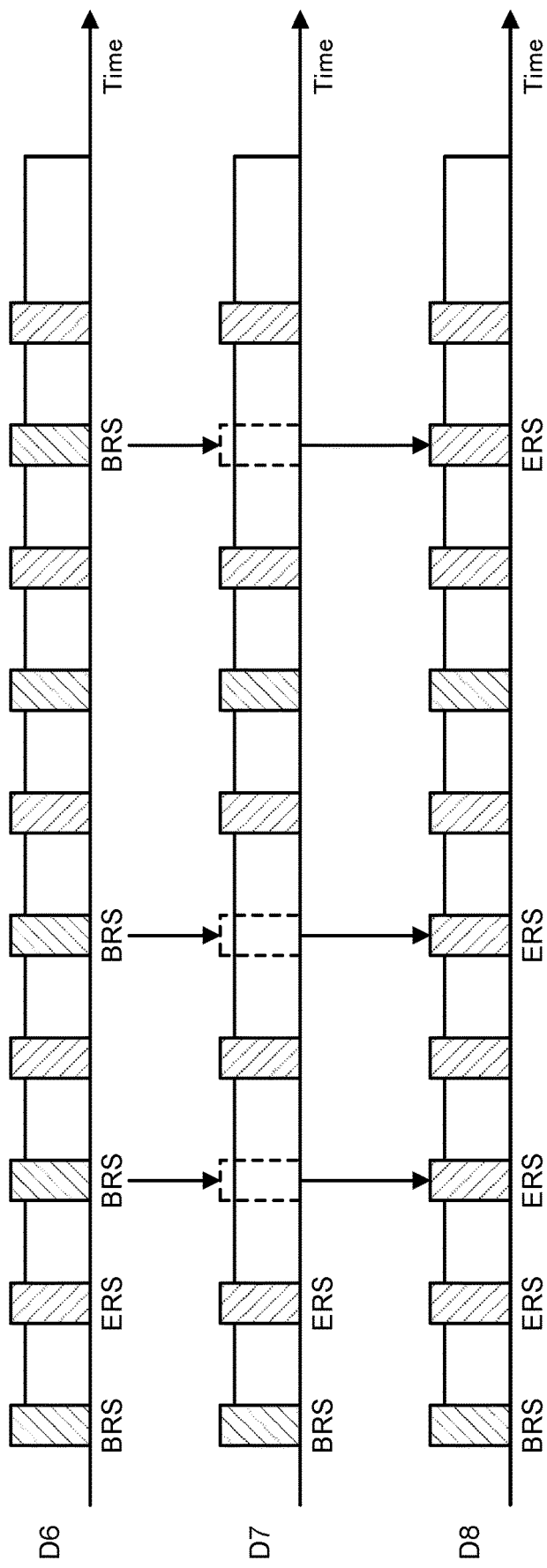
FIG. 19 illustrates an example of the RS design at the time of generation of the beams by the base station according to Embodiment 3.

FIG. 19 illustrates an example of RS design D8 at the time of generation of the beams by base station 40 according to Embodiment 3. The RS design in step S18 illustrated in FIG. 18 determines RS design D7 in which the BRS transmission periodicity is longer than in RS design D6. Furthermore, by performing step S31 illustrated in FIG. 18, RS design D8 is determined in which the ERS is mapped to the time resources to which no BRS transmission is assigned in RS design D7.

According to Embodiment 3, the ERS is mapped to the free time resources generated owing to the longer BRS periodicity. It is thus possible to transmit a greater number of ERSs without changing the total resource amount for the RS. Therefore, it is possible for mobile station 10 to estimate the CSI with a higher frequency, and thus, core apparatus 100 can easily follow the high-speed movement of mobile station 10.

Other Embodiments

In one exemplary configuration illustrated in FIG. 4, physical layer processing section 23 of base station 40 includes Doppler shift estimation section 25. Instead of this configuration, physical layer processing section 12 may include Doppler shift estimation section 25 depending on functional allotment between physical layer processing section 12 and physical layer processing section 23. Further, according to a configuration change, control section 21 of base station 40 may implement at least a part of the function of control section 11 of core apparatus 100, or control section 11 may implement at least a part of the function of control section 21.

Doppler shift estimation section 25 may be replaced with a "moving speed estimation section" that estimates the moving speed of mobile station 10. The moving speed of mobile station 10 may be estimated, for example, based on a history of beamforming (e.g., weighting) for mobile station 10. Further, the estimation of the moving speed of mobile station 10 may be performed by mobile station 10, and base station 40 may receive information indicating the moving speed of mobile station 10 estimated by mobile station 10 and transmit the information to core apparatus 100. In this case, core apparatus 100 may perform the RS design based on the information indicating the moving speed of mobile station 10.

Core apparatus 100 may be referred to as a communication control apparatus, aggregate node, aggregate base station, signal processing apparatus, BaseBand processing Unit (BBU), Centralized-BBU (C-BBU), or master station. In addition, base station 40 may be referred to as a distributed node, extension station, Radio Unit (RU), remote installation base station, transmission point, or slave station.

Hardware Configuration

The block diagrams used to describe the embodiments illustrate blocks on the basis of functions. These functional blocks (constituent sections) are implemented by any combination of hardware and/or software. A means for implementing the functional blocks is not particularly limited. That is, the functional blocks may be implemented by one physically and/or logically coupled apparatus. Two or more physically and/or logically separated apparatuses may be directly and/or indirectly (for example, via wires and/or wirelessly) connected, and the plurality of apparatuses may implement the functional blocks.

Figure 20:
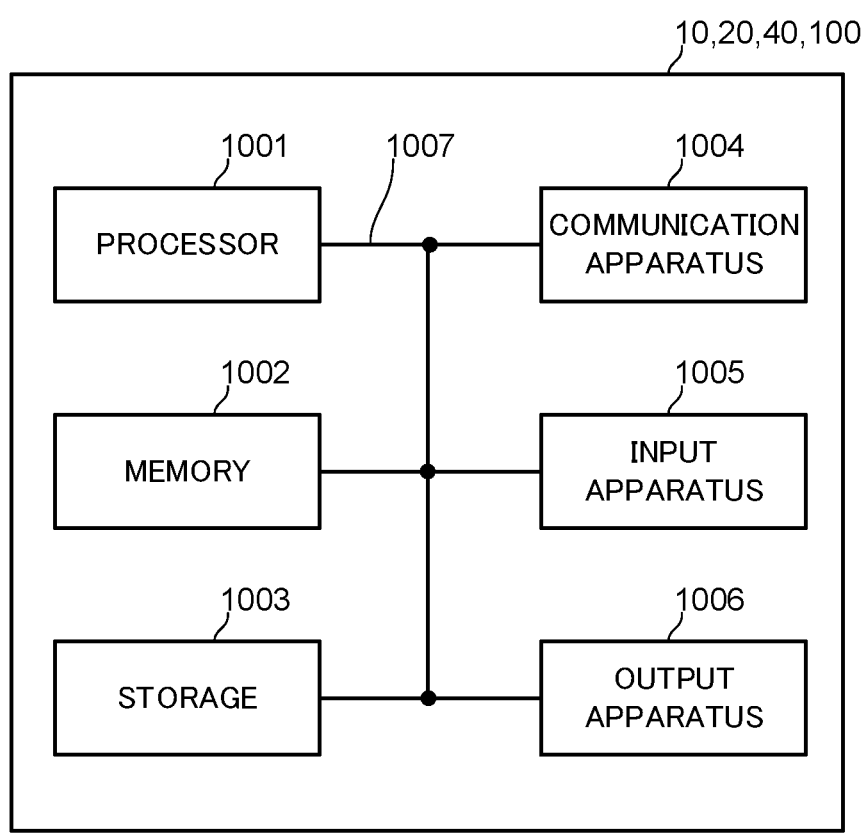
FIG. 20 illustrates an exemplary hardware configuration of the base station, the core apparatus, and the terminal.

For example, the base station, terminal, and the like according to an embodiment of the present disclosure may function as a computer that executes processing of a radio communication method of the present disclosure. FIG. 20 illustrates an example of a hardware configuration of mobile station 10, base station 20, base station 40, and core apparatus 100 according to an embodiment of the present disclosure. Physically, mobile station 10, base station 20, base station 40, and core apparatus 100 as described above may be a computer apparatus including processor 1001, memory 1002, storage 1003, communication apparatus 1004, input apparatus 1005, output apparatus 1006, bus 1007, and the like.

Note that the term "apparatus" in the following description can be replaced with a circuit, a device, a unit, or the like. The hardware configurations of mobile station 10, base station 20, base station 40, and core apparatus 100 may include one apparatus or a plurality of apparatuses illustrated in the drawings or may not include part of the apparatuses.

For example, although only one processor 1001 is illustrated, there may be a plurality of processors. The processing may be executed by one processor, or the processing may be executed by one or more processors at the same time, in succession, or in another manner. Note that processor 1001 may be implemented by one or more chips.

The functions in base station 20, base station 40, and core apparatus 100 are implemented by predetermined software (program) loaded into hardware, such as processor 1001, memory 1002, and the like, according to which processor 1001 performs the arithmetic and controls communication performed by communication apparatus 1004 or reading and/or writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control section 11, physical layer processing section 12, control section 21, physical layer processing section 23, and the like as described above may be implemented by processor 1001.

Processor 1001 reads out a program (program code), a software module, or data from storage 1003 and/or communication apparatus 1004 to memory 1002 and executes various types of processing according to the read-out program or the like. As the program, a program for causing the computer to perform at least a part of the operation described in the embodiments is used. For example, at least part of the functional blocks constituting base station 40 and core apparatus 100 may be implemented by a control program stored in memory 1002 and operated by processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that the program may be transmitted from a network through a telecommunication line.

Memory 1002 is a computer-readable recording medium and may be composed of, for example, at least one of a Read Only Memory (ROM), an Erasable Programmable ROM (EPROM), an Electrically Erasable Programmable ROM (EEPROM), and a Random Access Memory (RAM). Memory 1002 may be called as a register, a cache, a main memory (main storage apparatus), or the like. Memory 1002 can save a program (program code), a software module, and the like that can be executed to carry out the radio communication method according to an embodiment of the present disclosure.

Storage 1003 is a computer-readable recording medium and may be composed of, for example, at least one of an optical disk such as a Compact Disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called as an auxiliary storage apparatus. The storage medium as described above may be, for example, a database, a server, or other appropriate media including memory 1002 and/or storage 1003.

Communication apparatus 1004 is hardware (transmission and reception device) for communication between computers through a wired and/or wireless network and is also called as, for example, a network device, a network controller, a network card, or a communication module. For example, communication section 22, radio processing section 24, and the like as described above may be implemented by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that input apparatus 1005 and output apparatus 1006 may be integrated (for example, a touch panel).

The apparatuses, such as processor 1001 and memory 1002, are connected by bus 1007 for communication of information. Bus 1007 may be composed of a single bus or by buses different among the apparatuses.

Furthermore, base station 20, base station 40, and core apparatus 100 may include hardware, such as a microprocessor, a digital signal processor (DSP), an Application Specific Integrated Circuit (ASIC), a Programmable Logic Device (PLD), and a Field Programmable Gate Array (FPGA), and the hardware may implement part or all of the functional blocks. For example, processor 1001 may be implemented by at least one of these pieces of hardware.

Notification and Signaling of Information

The notification of information is not limited to the aspects or embodiments described in the present disclosure, and the information may be notified by another method. For example, the notification of information may be carried out by one or a combination of physical layer signaling (for example, Downlink Control Information (DCI) and Uplink Control Information (UCI)), upper layer signaling (for example, Radio Resource Control (RRC) signaling, Medium Access Control (MAC) signaling, notification information (Master Information Block (MIB), and System Information Block (SIB))), and other signals. The RRC signaling may be called an RRC message and may be, for example, an RRC connection setup message, an RRC connection reconfiguration message, or the like.

Applied System

The aspects and embodiments described in the present specification may be applied to at least one of a system using Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideB and (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

Processing Procedure and the like

The orders of the processing procedures, the sequences, the flow charts, and the like of the aspects and embodiments described in the present disclosure may be changed as long as there is no contradiction. For example, elements of various steps are presented in exemplary orders in the methods described in the present disclosure, and the methods are not limited to the presented specific orders.

Operation of Base Station

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

Direction of Input and Output

The information or the like (see the item of "Information and Signals") can be output from a higher layer (or a lower layer) to a lower layer (or a higher layer). The information, the signals, and the like may be input and output through a plurality of network nodes.

Handling of Input and Output Information and the like

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

Determination Method

The determination may be made based on a value expressed by one bit (0 or 1), based on a Boolean value (true or false), or based on comparison with a numerical value (for example, comparison with a predetermined value).

Variations and the like of Aspects

The aspects and embodiments described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiments described in the present disclosure. Modifications and variations of the aspects of the present disclosure can be made without departing from the spirit and the scope of the present disclosure defined by the description of the appended claims. Therefore, the description of the present disclosure is intended for exemplary description and does not limit the present disclosure in any sense.

Software

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or another remote source by using at least one of a wired technique (e.g., a coaxial cable, an optical fiber cable, a twisted pair, and a digital subscriber line (DSL)) and a radio technique (e.g., an infrared ray and a microwave), the at least one of the wired technique and the radio technique is included in the definition of the transmission medium.

Information and Signals

The information, the signals, and the like described in the present disclosure may be expressed by using any of various different techniques. For example, data, instructions, commands, information, signals, bits, symbols, chips, and the like that may be mentioned throughout the entire description may be expressed by one or an arbitrary combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

"System" and "Network"

The terms "system" and "network" used in the present disclosure can be interchangeably used.

Names of Parameters and Channels

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulas and the like using the parameters may be different from the ones explicitly disclosed in the present disclosure. Various channels (for example, PUCCH and PDCCH) and information elements, can be identified by any suitable names, and various names assigned to these various channels and information elements are not limitative in any respect.

Base Station

The terms "Base Station (BS)," "radio base station," "fixed station," "NodeB," "eNodeB (eNB)," "gNodeB (gNB)," "access point," "transmission point," "reception point, "transmission/reception point," "cell," "sector," "cell group," "carrier," and "component carrier" may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor remote radio head (RRH)). The term "cell" or "sector" denotes part or all of the coverage area of at least one of the base station and the base station subsystem that perform the communication service in the coverage.

Mobile Station

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or by some other appropriate terms.

Base Station/Mobile Station

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a vehicle (e.g., an automobile or an airplane), an unmanned mobile entity (e.g., a drone or an autonomous vehicle), or a robot (a manned-type or unmanned-type robot). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the user terminal. For example, the aspects and the embodiments of the present disclosure may find application in a configuration that results from replacing communication between the base station and the user terminal with communication between multiple user terminals (such communication may, e.g., be referred to as device-to-device (D2D), vehicle-to-everything (V2X), or the like). In this case, user equipment 10 may be configured to have the functions that the base station described above has. The wordings "uplink" and "downlink" may be replaced with a corresponding wording for inter-equipment communication (for example, "side"). For example, an uplink channel, a downlink channel, and the like may be replaced with a side channel.

Similarly, the user terminal in the present disclosure may be replaced with the base station. In this case, the base station is configured to have the functions that user equipment 10 described above has.

Meaning and Interpretation of Terms

As used herein, the term "determining" may encompass a wide variety of actions. For example, "determining" may be regarded as judging, calculating, computing, processing, deriving, investigating, looking up, searching (or, search or inquiry)(e.g., looking up in a table, a database or another data structure), ascertaining and the like. Furthermore, "determining" may be regarded as receiving (for example, receiving information), transmitting (for example, transmitting information), inputting, outputting, accessing (for example, accessing data in a memory) and the like. Also, "determining" may be regarded as resolving, selecting, choosing, establishing, comparing and the like. That is, "determining" may be regarded as a certain type of action related to determining. Also, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like hat are non-limiting and non-inclusive examples.

Reference Signal

The reference signal can also be abbreviated as an RS and may also be called as a pilot depending on the applied standard.

Meaning of "based on"

The description "based on" used in the present disclosure does not mean "based only on," unless otherwise specified. In other words, the description "based on" means both of "based only on" and "based at least on."

Terms "first" and "second"

Any reference to elements by using the terms "first," "second," and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

"Means"

The "means" in the configuration of each apparatus described above may be replaced with "section," "circuit," "device," or the like.

Open-ended Format

In a case where terms "include," "including," and their modifications are used in the present disclosure, these terms are intended to be inclusive like the term "comprising." Further, the term "or" used in the present disclosure is not intended to be an exclusive or.

Time Units such as a TTI, Frequency Units such as an RB, and a Radio Frame Configuration The radio frame may be constituted by one frame or a plurality of frames in the time domain. The one frame or each of the plurality of frames may be called a subframe in the time domain.

The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than the slot. A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit that represents the TTI may be referred to as a slot, a mini-slot, or the like instead of a subframe.

Here, the TTI, for example, refers to a minimum time unit for scheduling in radio communication. For example, in an LTE system, the base station performs scheduling for allocating a radio resource (a frequency bandwidth, a transmit power, and the like that are used in each user terminal) on a TTI-by-TTI basis to each user terminal. Note that, the definition of TTI is not limited to this.

The TTI may be a time unit for transmitting a channel-coded data packet (a transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that make up the minimum time unit for the scheduling may be controlled.

A TTI that has a time length of 1 ms may be referred to as a usual TTI (a TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or a fractional TTI), a shortened subframe, a short subframe, a mini-slot, a subslot, a slot, or the like.

Note that the long TTI (for example, the usual TTI, the subframe, or the like) may be replaced with the TTI that has a time length which exceeds 1 ms, and the short TTI (for example, the shortened TTI or the like) may be replaced with a TTI that has a TTI length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be identical regardless of the numerology, and may be 12, for example. The number of subcarriers that are included in the RB may be determined based on the numerology.

In addition, the RB may include one symbol or a plurality of symbols in the time domain, and may have a length of one slot, one mini slot, one subframe, or one TTI. One TTI and one subframe may be constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. Here, the common RBs may be identified by RB indices that use a common reference point of the carrier as a reference. The PRB may be defined by a certain BWP and may be numbered within the BWP. The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be changed in various ways.

Maximum Transmit Power

The "maximum transmit power" described in the present disclosure may mean a maximum value of the transmit power, the nominal UE maximum transmit power, or the rated UE maximum transmit power.

Article

In a case where articles, such as "a," "an," and "the" in English, for example, are added in the present disclosure by translation, nouns following these articles may have the same meaning as used in the plural.

"Different"

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

The present patent application claims the benefit of priority based on Japanese Patent Application No. 2019-085355 filed on April 26, 2019, and the entire content of Japanese Patent Application No. 2019-085355 is hereby incorporated by reference.

INDUSTRIAL APPLICABILITY

One aspect of the present disclosure is useful for mobile communication systems.

REFERENCE SIGNS LIST

10 Mobile station
11 Control section
12 Physical layer processing section
13 Communication section
20 Base station
21 Control section
22 Communication section
23 Physical layer processing section
24 Radio processing section
25 Doppler shift estimation section
26 BF section
30 Macro cell
40, 40-1, 40-2, 40-3, 40-4 Base station cell
50, 50-1, 50-2, 50-3, 50-4 Small or semi-macro cell
100 Core apparatus

The invention claimed is:

1. A base station, comprising:
a processor that assigns a common downlink reference signal to a plurality of beams based on a Doppler shift estimated using an uplink reference signal; and
a transmitter that transmits the common downlink reference signal in the plurality of beams,
wherein the processor assigns a separate downlink reference signal different from the common downlink reference signal to one or more beams different from the plurality of beams.

2. The base station according to claim 1, wherein the plurality of beams include at least one of a plurality of beams transmitted by another base station.

3. The base station according to claim 1, wherein the transmitter code-multiplexes, in a time axis, the common downlink reference signal transmitted a plurality of times.

4. The base station according to claim 1, wherein the processor
configures, to a second periodicity, a transmission periodicity of the common downlink reference signal transmitted using the plurality of beams, the second periodicity being longer than a first periodicity, and
assigns an additional downlink reference signal used for channel state measurement to a time resource for which mapping of the common downlink reference signal is scheduled in a case of the first periodicity.

5. A communication method for a base station, the communication method comprising the following performed by the base station:
assigning a common downlink reference signal to a plurality of beams based on a Doppler shift estimated using an uplink reference signal;
assigning a separate downlink reference signal different from the common downlink reference signal to one or more beams different from the plurality of beams; and
transmitting the common downlink reference signal in the plurality of beams.

* * * * *